(12) United States Patent
     Peverill et al.

(10) Patent No.: US 10,220,963 B2
(45) Date of Patent: Mar. 5, 2019

(54) AERIAL SYSTEM AND VEHICLE FOR CONTINUOUS OPERATION

(71) Applicant: Aurora Flight Sciences Corporation, Manassas, VA (US)

(72) Inventors: James Peverill, Manassas, VA (US); Terrence McKenna, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 170 days.

(21) Appl. No.: 15/291,874

(22) Filed: Oct. 12, 2016

(65) Prior Publication Data

US 2017/0023948 A1    Jan. 26, 2017

Related U.S. Application Data

(62) Division of application No. 14/213,450, filed on Mar. 14, 2014, now Pat. No. 9,527,392.

(Continued)

(51) Int. Cl.
    *B64F 1/02*     (2006.01)
    *B64C 39/02*    (2006.01)
    (Continued)

(52) U.S. Cl.
    CPC ............. *B64F 1/02* (2013.01); *B60L 11/1816* (2013.01); *B60L 11/1838* (2013.01);
    (Continued)

(58) Field of Classification Search
    CPC . B64F 1/02; B64F 1/362; B64C 25/68; B64C 39/024; B64C 2201/066;
    (Continued)

(56) References Cited

U.S. PATENT DOCUMENTS 6,960,750 B2    11/2005   Doane
7,059,564 B2     6/2006   Dennis
                (Continued)

OTHER PUBLICATIONS

Aurora Flight Sciences—Skate, retrieved from <www.aurora.aero/Products/skate.aspx> on Jan. 14, 2013.

*Primary Examiner* — Yuen H Wong
(74) *Attorney, Agent, or Firm* — Michael Stanley Tomsa; McAndrews, Held & Malloy, Ltd.; Eugene H. Nahm

(57) ABSTRACT

An aerial vehicle having a vision based navigation system for capturing an arresting cable situated at a landing site may comprise a fuselage having a propulsion system; an arresting device coupled to the fuselage, the arresting device to capture the arresting cable at the landing site; a camera situated on the aerial vehicle; an infrared illuminator situated on the aerial vehicle to illuminate the landing site, wherein the arresting cable has two infrared reflectors situated thereon; and an onboard vision processor. The onboard vision processor may (i) generate a plurality of coordinates representing features of the landing site using an image thresholding technique, (ii) eliminate one or more coordinates as outlier coordinates using linear correlation, and (iii) identify two of the plurality of coordinates as the two infrared reflectors using a Kalman filter.

20 Claims, 20 Drawing Sheets

Related U.S. Application Data

(60) Provisional application No. 61/851,866, filed on Mar. 14, 2013.

(51) Int. Cl.
| | | |
|---|---|---|
| *G05D 1/10* | (2006.01) | |
| *B60L 11/18* | (2006.01) | |
| *B64F 1/36* | (2017.01) | |
| *B64C 25/68* | (2006.01) | |
| *B64D 47/04* | (2006.01) | |
| *B64D 47/08* | (2006.01) | |
| *G06K 9/00* | (2006.01) | |

(52) U.S. Cl.
CPC ............ *B64C 25/68* (2013.01); *B64C 39/024* (2013.01); *B64D 47/04* (2013.01); *B64D 47/08* (2013.01); *B64F 1/362* (2013.01); *G05D 1/101* (2013.01); *G06K 9/0063* (2013.01); *B60L 2200/10* (2013.01); *B64C 2201/028* (2013.01); *B64C 2201/042* (2013.01); *B64C 2201/06* (2013.01); *B64C 2201/066* (2013.01); *B64C 2201/123* (2013.01); *B64C 2201/127* (2013.01); *B64C 2201/141* (2013.01); *B64C 2201/182* (2013.01)

(58) Field of Classification Search
CPC .......... B64C 2201/127; B64C 2201/06; B64C 2201/123; B64C 2201/028; B64C 2201/042; B64C 2201/141; B64C 2201/182; B64D 47/04; B64D 47/08; G06K 9/0063; B60L 11/1816; G05D 1/101
See application file for complete search history.

(56) References Cited

U.S. PATENT DOCUMENTS

| | | |
|---|---|---|
| 7,318,564 B1 | 1/2008 | Marshall |
| 7,714,536 B1 * | 5/2010 | Silberg ................. B60L 11/002 191/10 |
| 8,167,234 B1 | 5/2012 | Moore |
| 8,172,177 B2 | 5/2012 | Lovell et al. |
| 2003/0222173 A1 | 12/2003 | McGeer et al. |
| 2011/0057074 A1 | 3/2011 | Woodworth et al. |
| 2013/0175390 A1 | 8/2013 | Woodworth et al. |

* cited by examiner

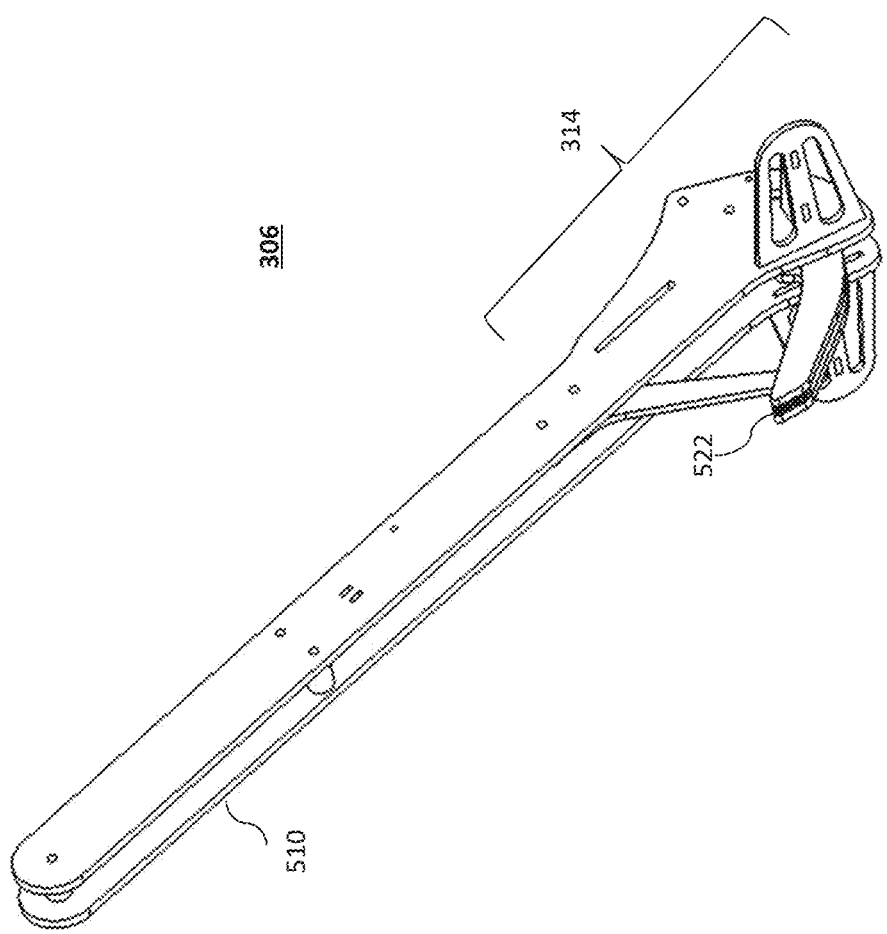

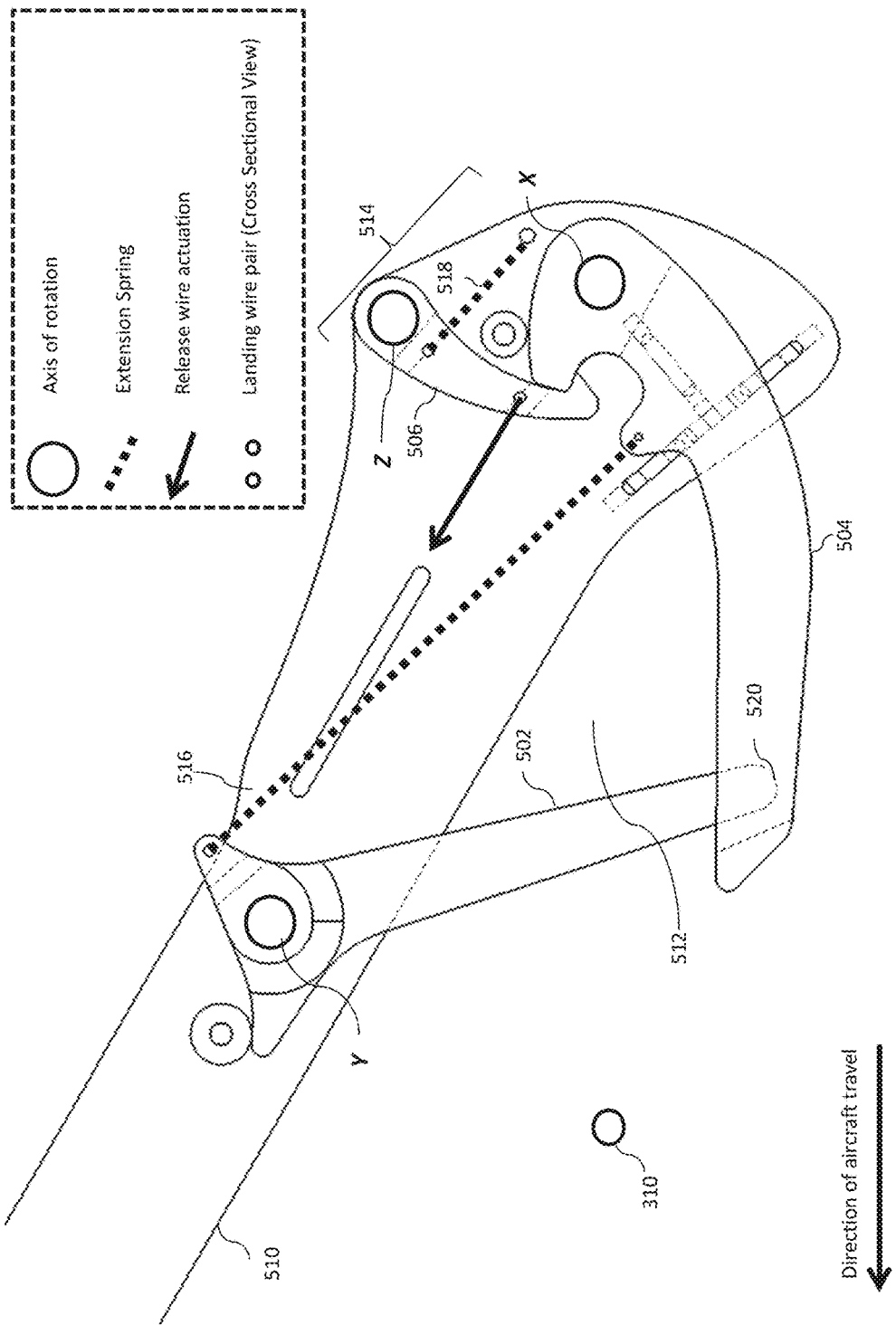

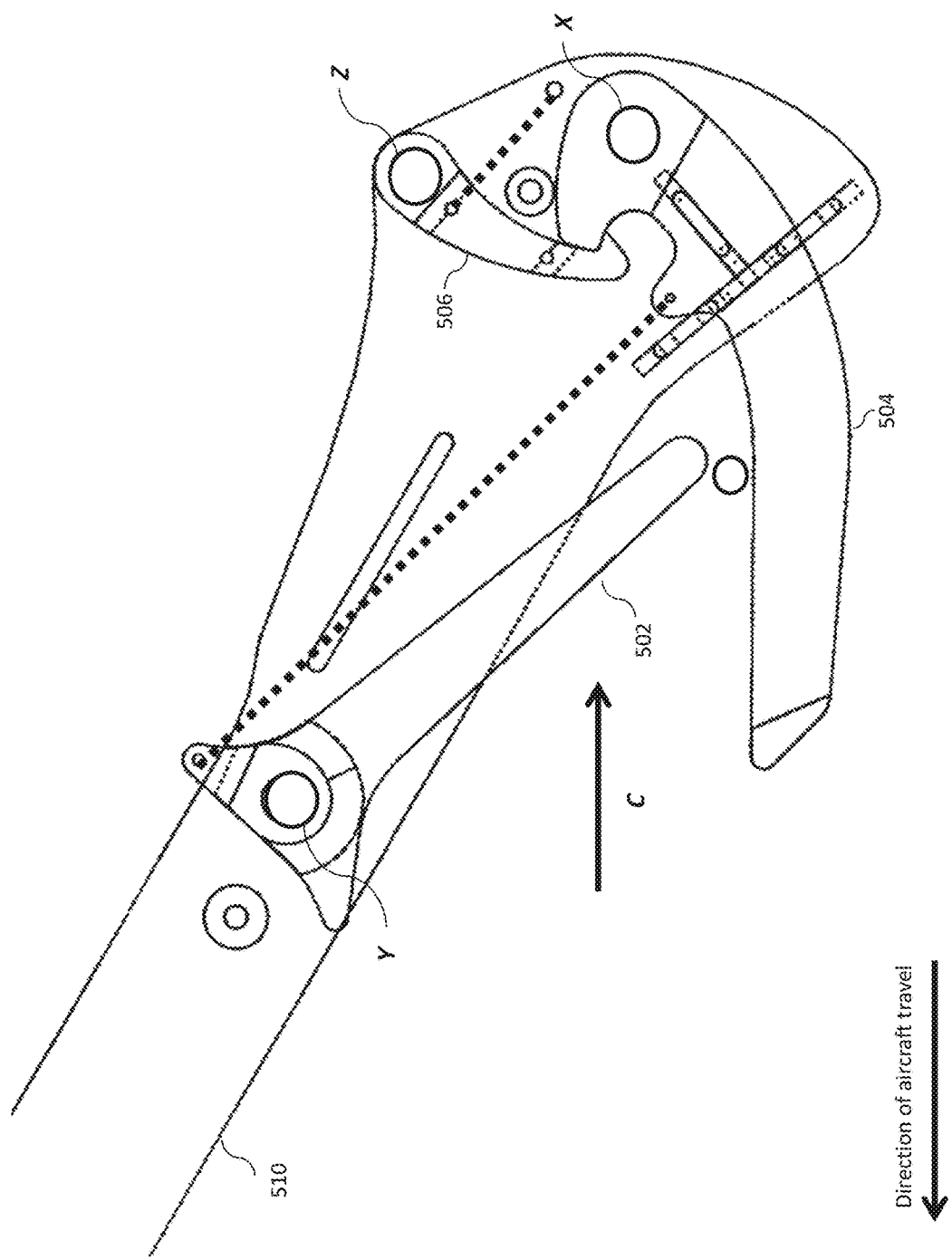

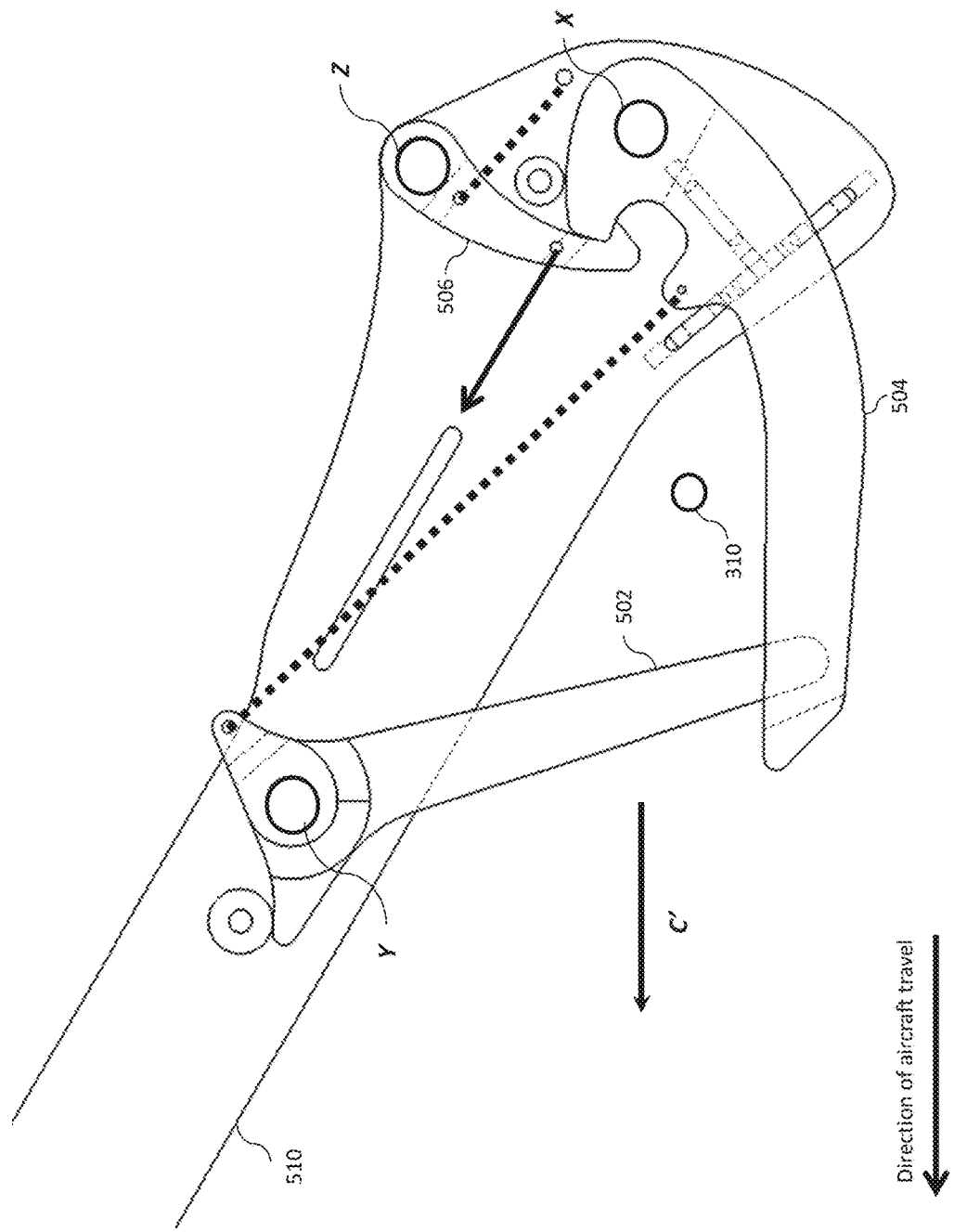

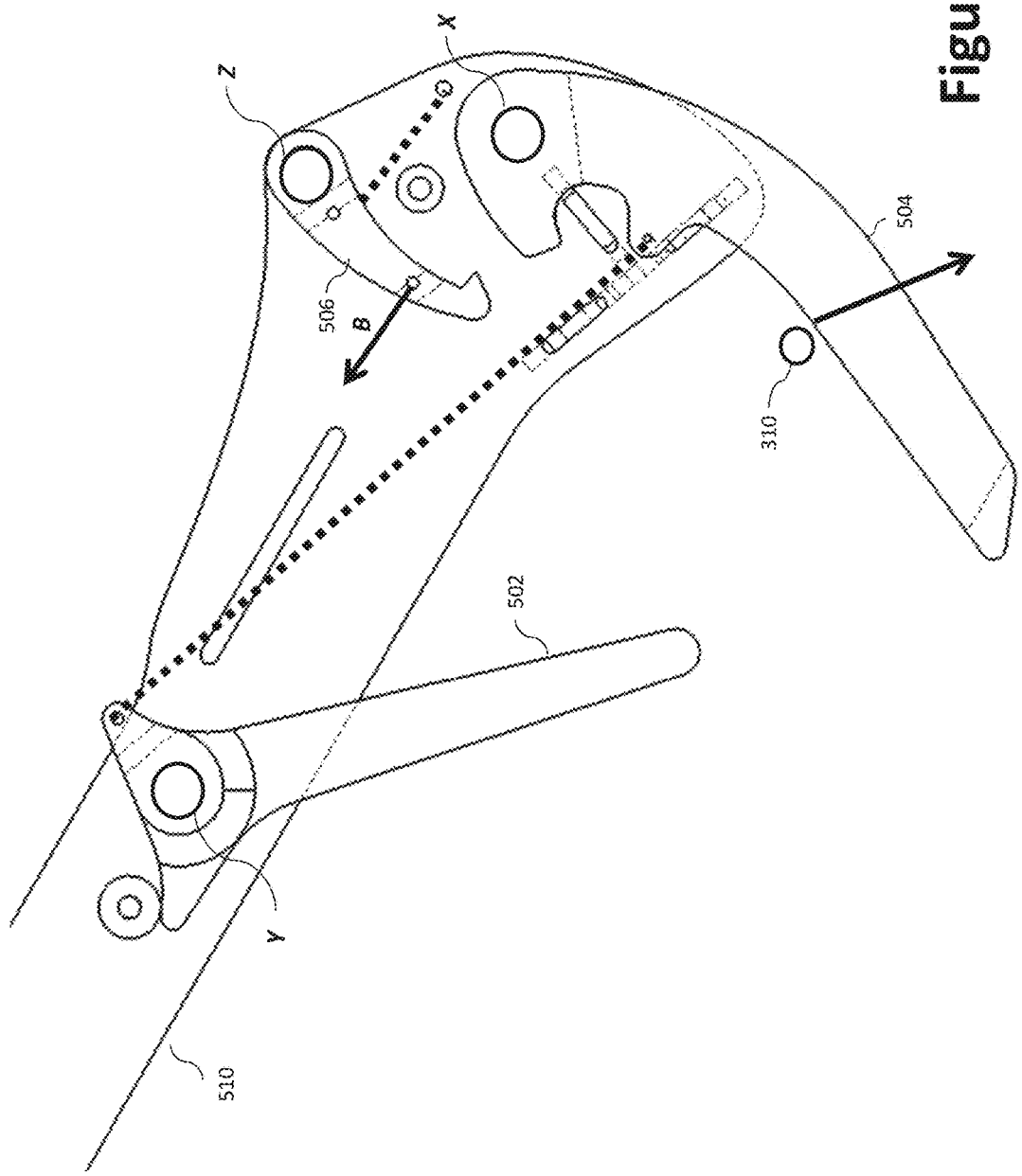

AERIAL SYSTEM AND VEHICLE FOR CONTINUOUS OPERATION

CROSS-REFERENCE TO RELATED APPLICATIONS

This application is a division of and claims priority to U.S. application Ser. No. 14/213,450, filed on Mar. 14, 2014, entitled "Aerial System and Vehicle for Continuous Operation," which claims priority to U.S. Provisional Patent Application No. 61/851,866, filed on Mar. 14, 2013, entitled "Aerial System and Vehicle for Continuous Operation," both of which are hereby incorporated by reference.

TECHNICAL FIELD

The present invention relates to systems and methods for use with Unmanned Aerial Vehicles ("UAVs") and Unmanned Aerial Systems ("UASs"). More specifically, the present invention relates to systems and methods for enabling the operation of an autonomous, self-charging aerial vehicle surveillance system.

BACKGROUND INFORMATION

The use of Unmanned Aerial vehicles ("UAVs") and Small Unmanned Aerial Systems ("SUASs") has grown in recent years and such UAVs and SUASs are employed in a wide variety of applications, including both military and civilian uses. In some applications, a UAV or SUAS may be required to maneuver quickly, or in tight spaces, over a wide range of speeds. Accordingly, several efforts have been made to improve UAV and SUAS performance to yield a fully autonomous UAV system.

For example, U.S. Pat. No. 6,960,750, to Doane, discusses an optical system and method for positioning a first object with respect to a second object, such as a refueling aircraft and an unmanned air vehicle, including a pattern of reflectors, an optical receiver, an optical transmitter, and a processor. U.S. Pat. No. 7,318,564, to Marshall, discusses a surveillance aircraft recharging system based on energy collection by magnetic induction from the current flowing in a randomly selected alternating current transmission line conductor. U.S. Pat. No. 7,714,536, to Silberg, discusses a method and apparatus for charging energy supplies in a UAV. U.S. Pat. No. 8,167,234, to Moore, discusses a micro air vehicle (MAV) that comprises features that emulate insect-like topology and flight, including a dangling three-part body (100a, 100b, 100c); wing-like, dual side rotors (107, 107a) positioned to either side on rotor arms (103) providing tilt and teeter motions to vector thrust and allowing crawling along improved surfaces; and elevators (101) that approximate the center of gravity and center of pressure control employed by insects via the inertial reaction and aerodynamic influence of a repositionable abdomen. U.S. Pat. No. 8,172,177, to Lovell, discusses a stabilized UAV recovery system. United States Patent Publication No. 2003/0222173, to McGeer, discusses a method and an apparatus for capturing a flying object.

While a number of UAVs and UAV systems are disclosed through the above references, existing UAVs and UAV systems are deficient in at least two respects. First, existing UAVs are not entirely self-sufficient and require routine upkeep, such as charging and/or refueling. Second, existing UAVs are generally concerned only with the cable capture (e.g., landing), but do not consider both the autonomous capture and release of the vehicle. Accordingly, the present application provides systems and methods for providing a self-charging UAV and UAV system capable of autonomous capture and release.

SUMMARY

The present disclosure endeavors to provide systems and methods for enabling the operation of an autonomous self-charging aerial vehicle surveillance system.

According to a first aspect of the present invention, an aerial vehicle system for gathering data comprises: a waypoint location, wherein the Waypoint Location comprises an arresting cable; a ground control station, wherein the ground control station comprises a charging cable; an aerial vehicle, wherein the aerial vehicle comprises an onboard battery, a capturing hook and a sensor payload for generating surveillance data; wherein the aerial vehicle is configured to autonomously travel between the Waypoint Location and the ground control station; wherein the aerial vehicle is configured to couple and decouple with the arresting cable via the capturing hook; wherein the aerial vehicle is configured to perch from the charging cable via the capturing hook; wherein the aerial vehicle is configured to electronically couple and decouple with the charging cable via the capturing hook to facilitate charging the aerial vehicle's onboard battery.

According to a second aspect of the present invention, a capturing hook for engaging a cable during capture and release of an aerial vehicle comprises: a first gate pivotally supported at a first end by a base portion and movable between (i) a closed position and (ii) an open position; a first return spring biasing the first gate to the closed position; a second gate pivotally supported at a first end by the base portion and movable between (i) a closed position and (ii) an open position; a second return spring biasing the second gate to the closed position; and a latch device comprising a movable locking part biased by a return spring to a locked position to lock the second gate in the closed position.

According to a third aspect of the present invention, a vision-based aerial vehicle navigation system for capturing an arresting cable comprises: a camera; an infrared illuminator positioned on an aerial vehicle; two or more infrared reflectors positioned on an arresting cable; and an onboard vision processor configured to calculate the centers of each of said two or more infrared reflectors.

BRIEF DESCRIPTION OF THE DRAWINGS

These and other advantages of the present invention will be readily understood with reference to the following specifications and attached drawings, wherein:

FIGS. 5a and 5b provide an enlarged view of an example arresting device;

FIGS. 6a through 6e provide enlarged views of the arresting device's capturing hook during the cable capture and release maneuver of FIGS. 4a through 4d;

DETAILED DESCRIPTION

Embodiments of the present invention will be described hereinbelow with reference to the accompanying drawings. In the following description, well-known functions or constructions are not described in detail because they would obscure the invention in unnecessary detail. For this application, the following terms and definitions shall apply:

The terms "communicate" and "communicating," as used herein, refer to both transmitting, or otherwise conveying, data from a source to a destination and delivering data to a communications medium, system, channel, network, device, wire, cable, fiber, circuit, and/or link to be conveyed to a destination.

The term "computer," as used herein, refers to a programmable device designed to sequentially and automatically carry out a sequence of arithmetic or logical operations, including without limitation, personal computers (e.g., those available from Gateway, Hewlett-Packard, IBM, Sony, Toshiba, Dell, Apple, Cisco, Sun, etc.), handheld, processor-based devices, and any other electronic device equipped with a processor or microprocessor.

The term "processor," as used herein, refers to processing devices, apparatus, programs, circuits, components, systems and subsystems, whether implemented in hardware, tangibly embodied software or both, and whether or not programmable. The term "processor," as used herein includes, but is not limited to, one or more computers, hardwired circuits, signal modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines and data processors.

The present disclosure endeavors to provide systems and methods for enabling the operation of an autonomous self-charging aerial vehicle surveillance system. More specifically, the present disclosure endeavors to provide systems and methods for providing a self-charging UAV and UAV system capable of autonomous capture and release for use in a Continuous Operation System. While utilizing utility power lines for both perching and inductance charging is possible, a UAV system of the present invention preferably utilizes off-site charging through direct current lines (e.g., via a charging cable 804). An advantage of this approach is that the charging mechanisms on the UAV may be simplified, thus reducing the cost and weight of the UAV. Moreover, by using off-site charging stations equipped with direct current lines, UAVs are not forced to rely on ideal conditions of the power line to facilitate charging (e.g., current, voltage, diameter, etc.), thus expanding the scope of suitable Waypoint Locations.

Figure 1:
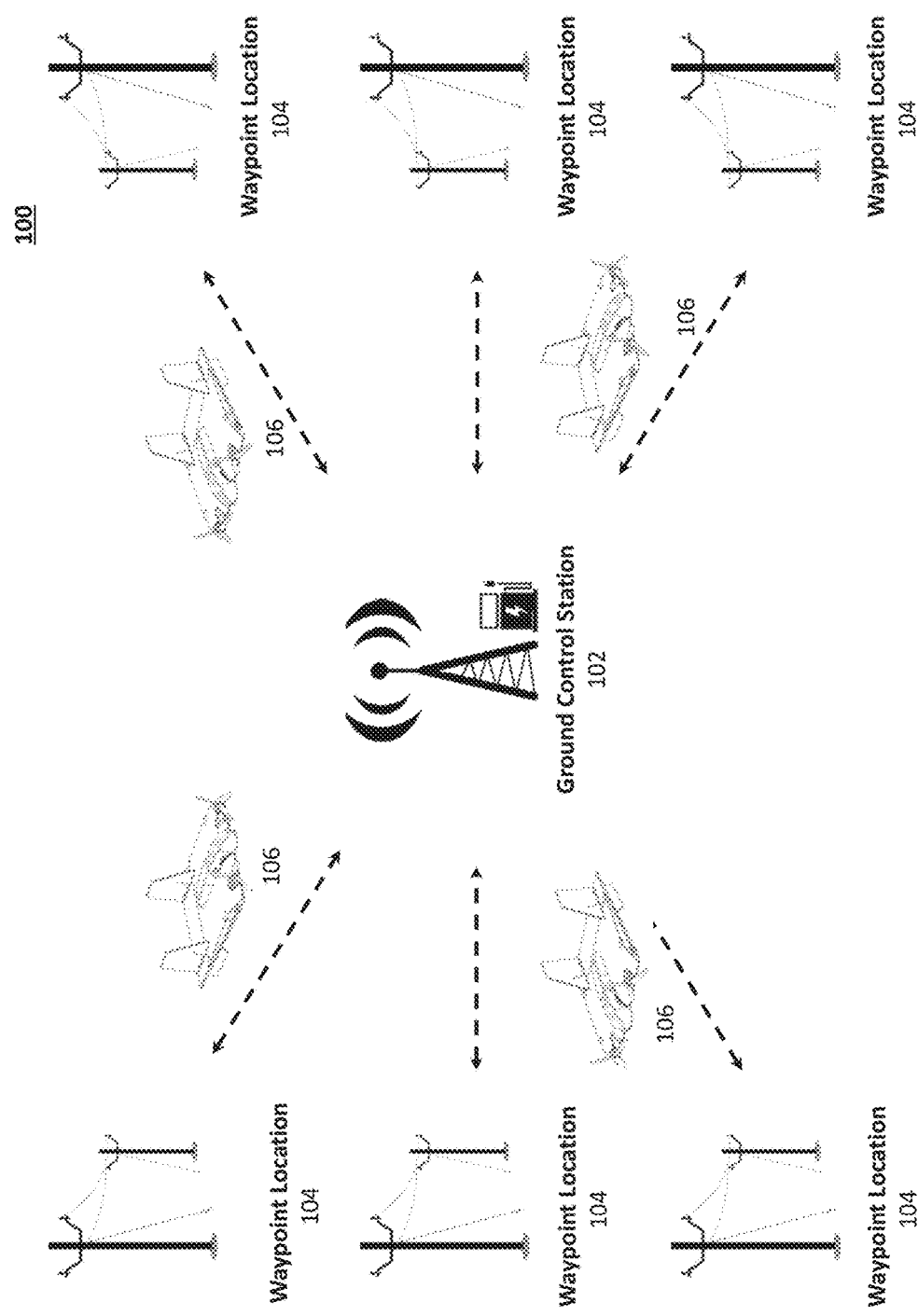
FIG. 1 illustrates an example Continuous Operation System.

For example, as illustrated in FIG. 1, a Continuous Operation System 100 may permit continuous, fully autonomous operation of one or more UAVs 106 for surveillance purposes. Each UAV 106 may employ one or more sensors to facilitate autonomous flight, including, but not limited to, ultrasonic sensors, infrared sensors, radar and the like. To collect data and monitor an area, the UAV 106 may be equipped with a traditional intelligence, surveillance, and reconnaissance (ISR) payload. For example, the UAV 106 may be equipped with a payload pod comprising one or more cameras, audio devices and other sensors. Any video, image, audio, telemetry and/or other sensor data ("Surveillance Data"), collected by the UAV 106 may be locally stored or wirelessly communicated from the UAV 106 (e.g., at the Waypoint Location 104 or during flight) to a Ground Control Station 102 in real time using an antenna coupled with an onboard wireless communication device, such as a transmitter/receiver. Alternatively, Surveillance Data may be communicated, or otherwise transferred, to the Ground Control Station 102 or another party via a wired connection.

In operation, a UAV 106 may alternate between a Waypoint Location 104 and a charging location, such as a Ground Control Station 102. The UAV 106 should be capable of autonomous landing and takeoff using, for example, an optical sensing system with an onboard precision vision-processing computer. At each of the Waypoint Location 104 and Ground Control Station 102, the UAV 106 may capture an arresting cable 310 to arrest itself and perch. As used herein, the two general types of arresting cables 310 include perching cables and charging cables 804. Each of the perching cable and the charging cable 804 are capable of capturing and supporting a UAV 106 while it perches, however, as will be discussed in greater detail below, a charging cable 804 provides the additional function of charging the UAV 106's batteries.

For example, at the Waypoint Location 104, a utility power transmission line may function as a perching cable. To facilitate targeting when perching, a predetermined perching point on the perching cable may be marked using markers, such as IR reflectors. A UAV 106 may be further configured to autonomously charge itself upon return to the Ground Control Station 102, or other charging stations, through an electrified charging cable 804 on which the UAV 106 may perch and recharge. Accordingly, at the Ground Control Station 102, a charging cable 804 may comprise two direct current wires carrying power and ground transmission. As with the Waypoint Location 104, a predetermined perching point may be marked on the charging cable 804 using markers.

Depending on the operation, the Ground Control Station 102 may be permanently installed or portable to facilitate on-the-move operations. By employing a plurality of UAVs 106 in a Continuous Operation System 100, continuous fully autonomous surveillance is enabled, thus enabling continuous surveillance by providing a real time Surveillance Data feed to the Ground Control Station 102 and/or another monitoring facility.

Figure 2:
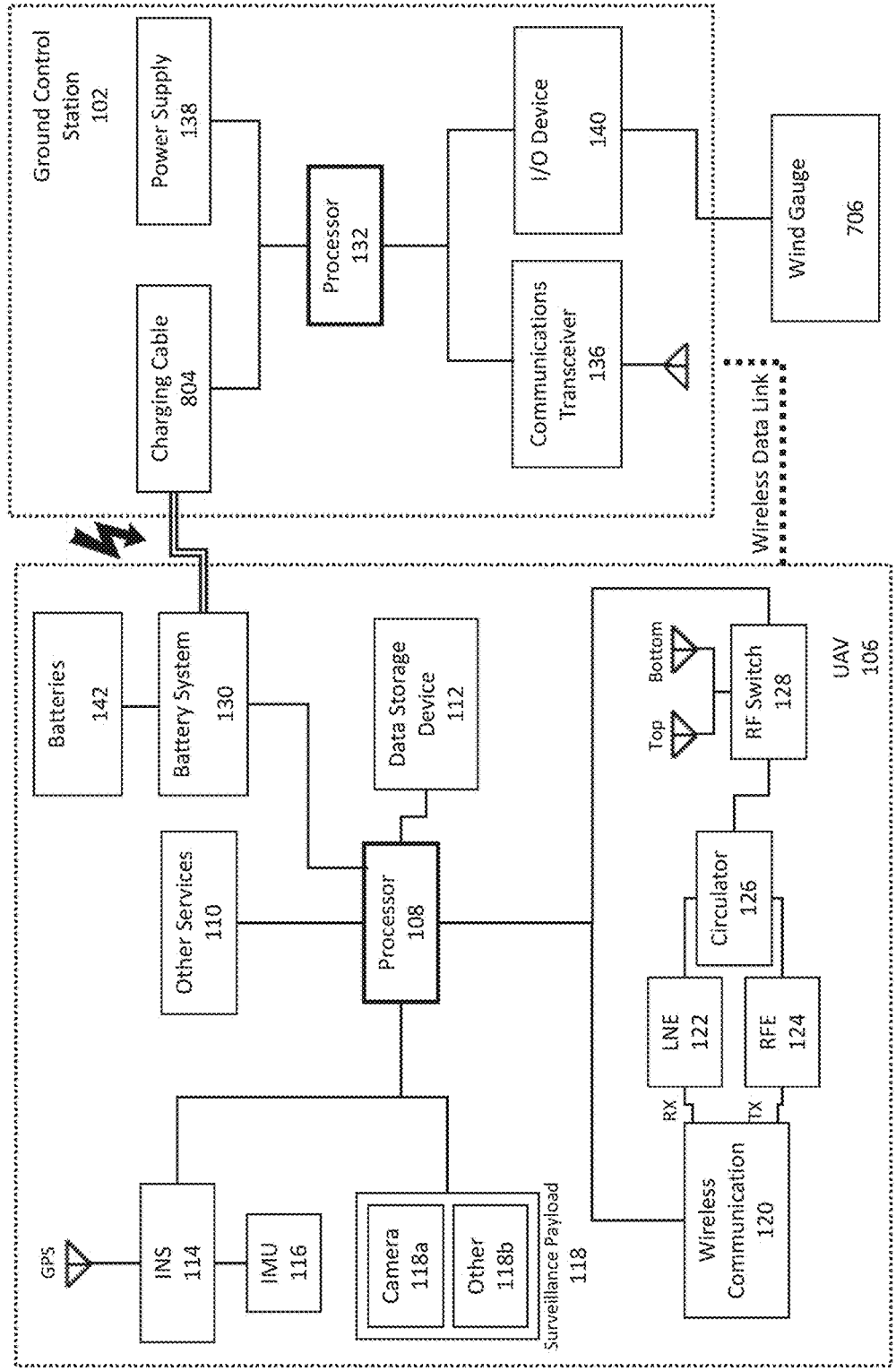
FIG. 2 illustrates a block diagram of a UAV communicatively coupled with a Ground Control Station.

FIG. 2 provides a block diagram for a UAV 106 communicatively coupled with a Ground Control Station 102 via a wireless data link. Each UAV 106 typically includes an onboard processor 108 that controls the various UAV components and functions. The processor 108 may be communicatively coupled with an Inertial Navigation System ("INS") 114 (e.g., Vector Nav VN-100) that is communicatively coupled with an inertial measurement unit 116 and GPS receiver, an onboard data storage device 112 (e.g., hard drive, flash memory, or the like), a surveillance payload 118, one or more batteries 142, a battery system 130, a wireless communication device 120, or virtually any other desired services 110.

To collect data and monitor an area, the UAV 106 may be equipped with a traditional ISR surveillance payload 118. For example, the UAV 106 may be equipped with one or more cameras 118a, audio devices, and/or other sensors 118b. Any Surveillance Data collected by the UAV 106 may be wirelessly communicated to the Ground Control Station 700 in real time via the wireless communication device 120. The UAV 106 may be further equipped to store said Surveillance Data to an onboard data storage device 112. However, if the UAV 106 is operated in an unfriendly zone, it may be advantageous to encrypt all stored data, including Surveillance Data, or to implement a data self-destruction protocol. The UAV 106 may be programmed to erase, or otherwise destroy, the onboard data storage device 112 if the UAV 106 determines that it may have fallen into an enemy's possession. For example, the UAV 106 onboard data storage device may be erased automatically when communication between the Ground Control Station 102 and UAV 106 is lost or upon touching down in a location outside of a predefined radius from the Ground Control Station 102 and/or Waypoint Location 104, based on GPS calculations, or, if a crash is detected, e.g., based on detection of a sudden impact.

Data may be communicated between the UAV 106 and Ground Control Station 102 via the wireless communication device 120, which is operatively coupled to the processor 108. For example, the wireless communication device 120 may be configured to communicate data (e.g., Surveillance Data and/or flight control data) with the Ground Control Station 102. To facilitate optional wireless communication, the UAV 106 may further comprise an air communication link 120 enabled to transmit ("TX") and receive ("RX") data using one or more antennas (e.g., top and bottom) via a circulator 126, LNE 122 and RFE 124. The antenna may be controlled via the processor 108 that is operatively coupled to an RF switch 128.

In urban environments, multipath interference can become a problem. Thus, standard analog video transmitters and many digital transmission methods may not be able to cope with this type of interference. Therefore, to mitigate this problem, the UAV may be equipped with coded orthogonal frequency division multiplexing ("CoFDM") radios. CoFDM is a modulation format that is highly resistant to multipath interference. Since an operation may call for the UAV 106 to communicate Surveillance Data from a stationary Waypoint Location 104 below a roofline, a multipath resistant radio may be useful by eliminating the need to launch and re-land to improve radio reception from a perching point.

The Ground Control Station 102 typically includes a processor 132 that controls the various Ground Control Station 102 components and functions. The processor 132 may be communicatively coupled with a communication transceiver 136, an I/O device 140, a power supply 138 and a charging cable 804. When the UAV 106 is perched on the Ground Control Station 102's charging cable 804, the UAV 106's battery system 130 is electrically coupled with the Ground Control Station 102's Power Supply 138, thereby charging the UAV 106's one or more onboard batteries 142. As noted above, to reduce weight and cost, it is preferable to directly couple the battery system 130 with the Ground Control Station 102's Power Supply 138 via the charging cable 804. However, other methods are possible, such as inductance charging.

The Ground Control Station 102's communication transceiver 136 may be used to wirelessly communicate data signals with the UAV 106 and/or an end user. Specifically, Surveillance Data collected by the UAV 106 may be transmitted in real time to the end user for live viewing, or to an apparatus (e.g., a computer) where it may be stored and/or displayed. Similarly, flight control data (i.e., flight commands from the end user or a flight computer) may be communicated between the Ground Control Station 102 and UAV 106 using the communication transceiver 136. Alternatively, the Ground Control Station 102 may employ separate communication transceivers for communicating with the UAV 106 and with an end user. For example, the Ground Control Station 102 may communicate with an end user through a pre-configured high bandwidth directional data link and/or a satellite-based tactical data link. As illustrated, the Ground Control Station 102 may be electronically coupled to a power supply 138. The power supply 138 may be, for example, a battery, a generator, line current (e.g., from a power grid), a solar cell, etc. The I/O Device 140 may be coupled with one or more sensors, such as a wind gauge 706.

To further enhance data communication, the Ground Control Station 102 may be equipped with an enhanced data receiving system. For example, the Ground Control Station 102 may be provided with a mechanically steered antenna system, or a multi-antenna diversity system that can allow much higher gain antennas to be used, thereby greatly extending the range of the UAV's data link without increasing the power consumption of the UAV 106's transmitting radios. With each additional antenna added to the system, a higher gain antenna can be utilized. For example, the Ground Control Station 102 may employ a smart antenna (e.g., an adaptive array antenna, multiple-antenna and multiple-input and multiple-output) combined with smart signal processing algorithms for (i) identifying spatial signal signatures such as the direction of arrival (DOA) of the signal, and (ii) calculating beam-forming vectors to track and locate the antenna beam on the mobile/target.

While multiple identical UAVs 106 are illustrated in FIG. 1, a Continuous Operation System 100 may employ a plurality of UAVs 106 of different types and sizes. Indeed, specially equipped UAVs 106 may be deployed to a particular Waypoint Location 104 to meet a specific need. However, compact lightweight UAVs are generally advantageous as they yield minimal detection and reduce weight imposed on the arresting cable 310. Indeed, as will be shown below, a suitable UAV 106 that may be modified to facilitate Continuous Operation System operations includes the backpackable Skate™ UAS, available from Aurora Flight Sciences.

The Skate™ system is able to fly with its ISR payload, The Skate™ system can carry out autonomous missions from takeoff to landing without pilot intervention, but it is not able to land and take off again without assistance. The Skate™ system uses independently articulating thrust vectoring motor pods to allow rapid transition between vertical and horizontal flight. Transitioning from vertical take-off and landing (VTOL) to wing-borne flight increases the endurance and range of the system to levels characteristic of a fixed-wing platform and far beyond those of a traditional VTOL asset. The thrust vectoring provided by the motor pods allows the Skate™ UAV to fly both vertically and horizontally indoors and out, enabling rapid navigation of cluttered environments such as city streets or building interiors. For additional information regarding the Skate™ system, see Aurora Flight Science's website and commonly owned U.S. Pat. No. 8,721,383 (filed Sep. 9, 2009) and U.S. Pat. No. 8,500,067 (filed Aug. 4, 2012), which are each entitled "Modular Miniature Unmanned Aircraft With Vectored-Thrust Control."

While the present invention illustrates a modified Skate™ UAV in the Continuous Operation System 100, one of skill in the art would appreciate that the present invention should not be limited to use with the Skate™-type UAVs. On the contrary, virtually any small UAV or SUAS may be modified to meet the objectives of a Continuous Operation System 100. Such features including, for example, unattended recharging, autonomous cable capture and launch, and video-based flight controls that permit accurate perching point targeting, as well as the extended endurance to a one hour mission with a half-pound payload. However, a modified Skate™ UAV is illustrated in the following examples because of its advantageous airframe characteristics. Moreover, the Skate™ UAV may be equipped with an autopilot capable of flying to waypoints (e.g., a Waypoint Location 104) and performing many fully autonomous missions through a full suite of sensors including, for example, GPS, barometric pressure for altitude, differential pressure (e.g., a Pitot tube) for airspeed, and a full 9-DOF inertial measurement unit.

The existing Skate™ UAS configuration represents a balance of the need for vertical launch/recovery, with the desire for persistent presence, and the physical constraints imposed by back packability (e.g., the ability to carry the UAV in a backpack). Therefore, the resulting Skate™ planform compromises by providing an aspect ratio selection driven by maneuvering and payload constraints, as opposed to an optimized cruise case, and wingspan limited by packaging requirements. This low aspect ratio planform provides a wide angle of attack envelope, facilitating inbound perch transition and controlled steep glide slopes for landing/maneuvering in confined spaces, but increasing induced drag at cruise. However, relaxing the aspect ratio constraint, by incrementally increasing wingspan, can improve cruise performance with minimal impact on maneuvering and storage capabilities. Therefore, because back packability is not necessarily required in a Continuous Operation System 100, lengthening the wingspan of the UAV 106 can both increase the aspect ratio and reduce the wing loading, translating directly to lower cruise power requirements.

Figure 3A:
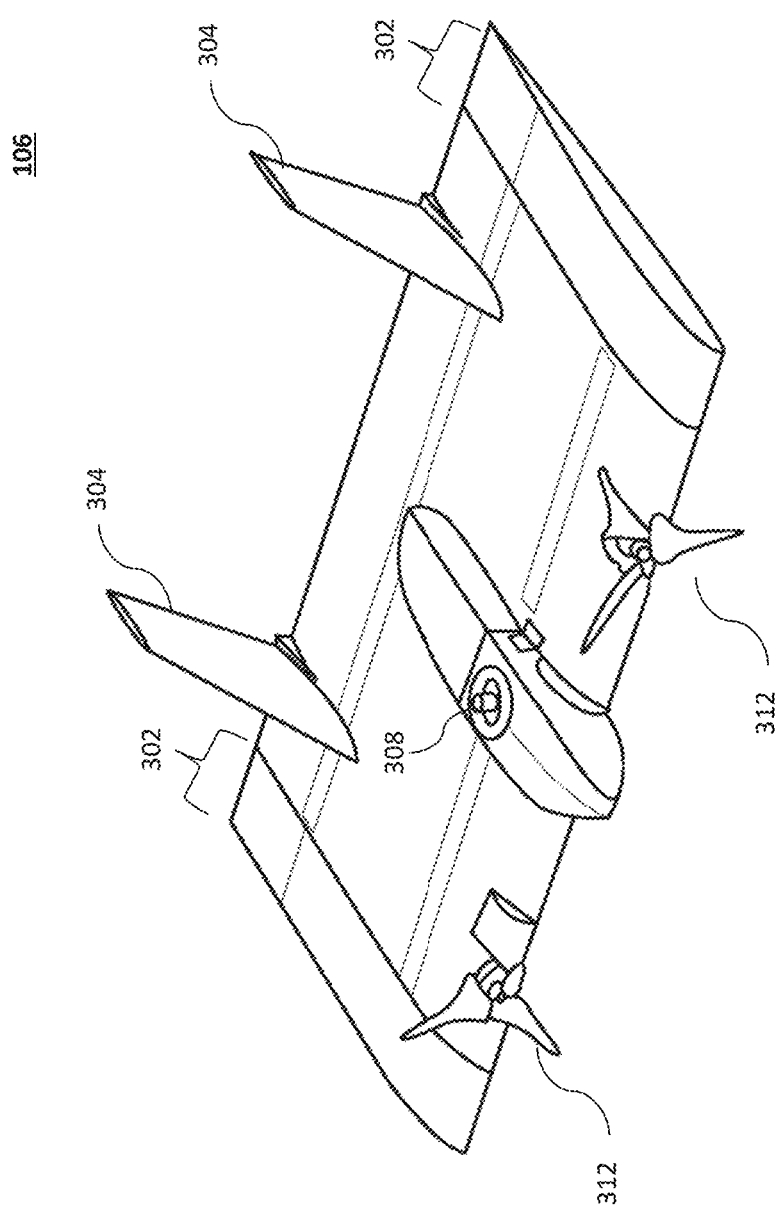
FIGS. 3a and 3b illustrate an example UAV for use with a System.

Indeed, as illustrated in FIG. 3a, a Skate™ UAV may be modified using, for example, 3-inch wingtip extension 302 on each wing. By implementing wingtip extensions 302, changes to the Skate™ UAV's mechanical/propulsion systems are not required. To account for the increase in wingspan, the vertical stabilizers 304 may also be enlarged, or raked, to meet new tail volume requirements. To enable perching on an arresting cable 310, any sub fins may be eliminated from the underside of the UAV 106 thereby avoiding interference with any landing/capture devices, including arresting devices 306.

Figure 3B:
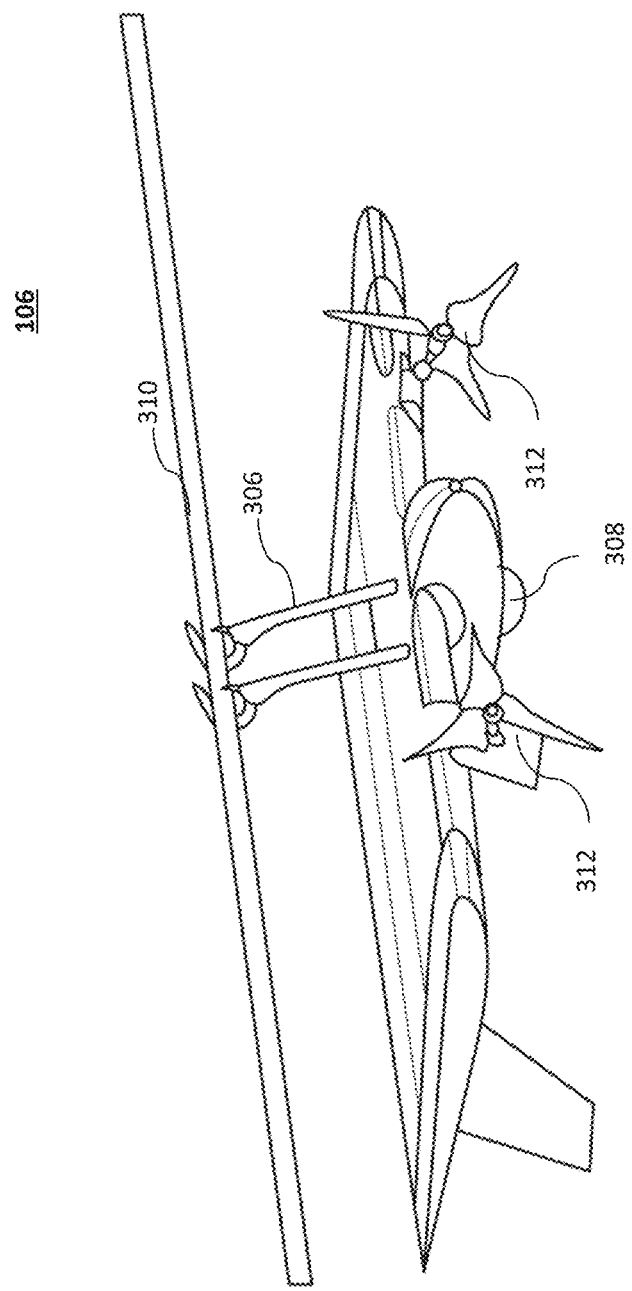

The UAV 106 should also be configured to capture onto, or otherwise engage, an arresting cable 310 using one or more arresting devices 306 located on the underside of the UAV 106. During and after the arresting operation, the UAV 106 may be configured to swing down and hang inverted from the arresting cable 310 to execute its surveillance objectives as illustrated in FIG. 3b. Providing the arresting devices 306 on the underside of the UAV 106 allows for increased clearance between the oncoming arresting cable 310 and the propellers 312, but also allows for excellent ground visibility from the surveillance payload pod 308. Accordingly, a UAV 106's ISR payload pod 308 may be preferably located on the top of the UAV 106 (e.g., opposite the arresting device 306). Therefore, when the UAV 106 is hanging inverted, the payload pod 308 faces downward, and provides the opportunity to mount a gimbaled camera, or other sensors, with a full 360-degree view of the ground. This orientation also maximizes exposure of the payload pod 308 with the ground where, from this position, the UAV 106 will be able to observe any ground location below the arresting cable 310.

To facilitate surveillance functionality, the UAV may wirelessly transmit Surveillance Data back to the Ground Control Station 102. From there, the data may be relayed to end users (e.g., remote operators) either through a pre-configured high bandwidth directional data link or through a satellite-based tactical data link. Alternatively, the UAV may wirelessly transmit any data directly to the remote operators.

To facilitate capture (landing) and release (takeoff), the cable-arresting mechanical system, which may comprise one or more arresting devices 306, may be designed to release the UAV 106 either on command (i.e., actively) or when the UAV 106 generates enough thrust to lift off the arresting cable 310 (i.e., passively). For example, the UAV 106 may power its motors to reaches a stable condition wherein the vehicle is pointed nearly vertically (e.g., perpendicular to the ground) and is pulling against the arresting cable 310. At this point, the autopilot simultaneously applies increased power to the motors and actuates the servo releasing the one or more arresting devices 306's hook from the arresting cable 310. Thus, the UAV 106 releases from the arresting cable 310 and launches vertically to a predetermined altitude before resuming level flight and navigation to a waypoint location (e.g., Ground Control Station 102 and/or Waypoint Location 104). Before the takeoff sequence, the UAV 106 hangs inverted, but since the propellers 312 are offset from the arresting devices, rotating back to vertical is not a difficult operation.

To facilitate capture and release of the arresting cable 310, the UAV's flight control system may be provided with camera-derived estimates of the target arresting cable 310's relative azimuth, elevation, and range. Together with the state estimate of the vehicle itself, this information is sufficient to determine line-of-sight rate and range rate to the target, which in turn can be used to implement a homing algorithm such as pure pursuit, proportional navigation (PN), or variations on PN that reduce the reliance on range rate information (which may be of lower accuracy in windy situations). For example, in operation, the UAV may guide itself to the desired landing site using GPS, along the approach heading designated by the installation crew. Once the UAV comes within a predetermined distance of the landing zone (e.g., about 20-30 feet from the perch point) the UAV can activate the sensing system. The UAV may detect the cable markers (e.g., IR illuminators and/or IR reflectors) and may utilize a terminal guidance algorithm to impact the arresting cable 310 at a slower cruise. In the event that the sensing system does not detect the markers, or the UAV encounters a wind gust and misses the arresting cable 310, the UAV can perform an abort operation. An abort operation may comprise, for example, climbing rapidly above obstructions. Since the UAV may be capable of a vertical takeoff, the UAV can rapidly ascend to a safe altitude and fly around for another attempt.

The UAV 106 may employ an onboard vision processing system capable of performing real time centroiding on the incoming video and calculating relative altitude estimates. This may be done at a conservative minimum of 30 frames per second (fps), although 60 fps may be preferable. For example, an OMAP™ 3-based cellular phone processor may be used to provide a vision processing system because it is highly miniaturized and designed for low power operation. The perch point cable markers may be placed on an arresting cable 310 and may be detected using, for example, IR beacons, coupled with the onboard vision processing system. This method is advantageous because IR light can be effectively utilized in both day and night with proper selection of IR frequency (e.g., 940 nm). Since centroiding generates sub-pixel resolution accuracy, high pixel camera resolution may not be necessary to achieve high accuracy results. Consequently, the primary metrics for selection of the camera may be size, weight and ease of integration. For example, a suitable camera may be a miniature camera based on an Aptina monochrome image sensor. Testing of the marker performance is analyzed through an RGB intensity graph.

Figure 8:
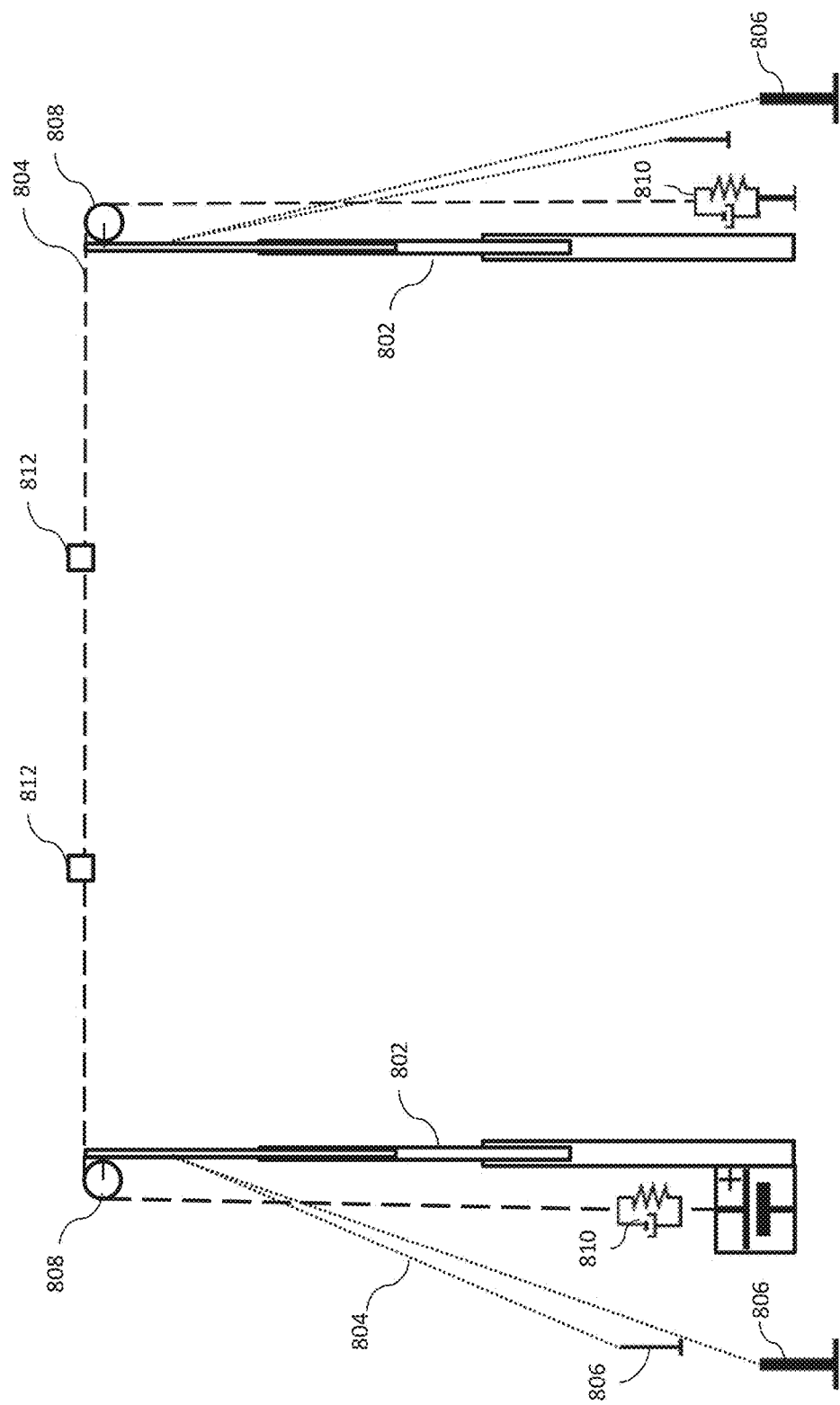
FIG. 8 illustrates a schematic diagram of a Ground Control Station 102.

Accordingly, as illustrated in FIG. 8, arresting cables 310, whether charging or perching cables, may be marked with a marker 812, such as active IR illuminator (e.g., Phoenix Jr. Infrared Beacons) and/or IR reflectors (e.g., retro-reflective tape), which functions in IR (e.g., "Glint Tape" that is available from U.S. Tactical Supply; Emdom retro-reflective ID Marker; 3M 3000X or 3M 7610 Reflective Tape; or another all-purpose adhesive light strips). The IR illuminator has the advantage of not requiring an IR light source on the UAV, but would require power of some kind (e.g., onboard batteries.) Conversely, the IR reflectors, which are passive, would require an illuminator on the UAV.

For example, two markers may be attached to the arresting cable 310 to enable the vehicle to easily detect relative bank angle compared to the cable, relative pitch and heading as well as to estimate a rough distance to target. The onboard vision processing can centroid the incoming images, and determines the centers of the IR beacons in the field of view. To identify a perching point, the vision processing system can input these centroid coordinates and calculate the relative altitude estimates to feed into the landing control system.

Figure 4A:
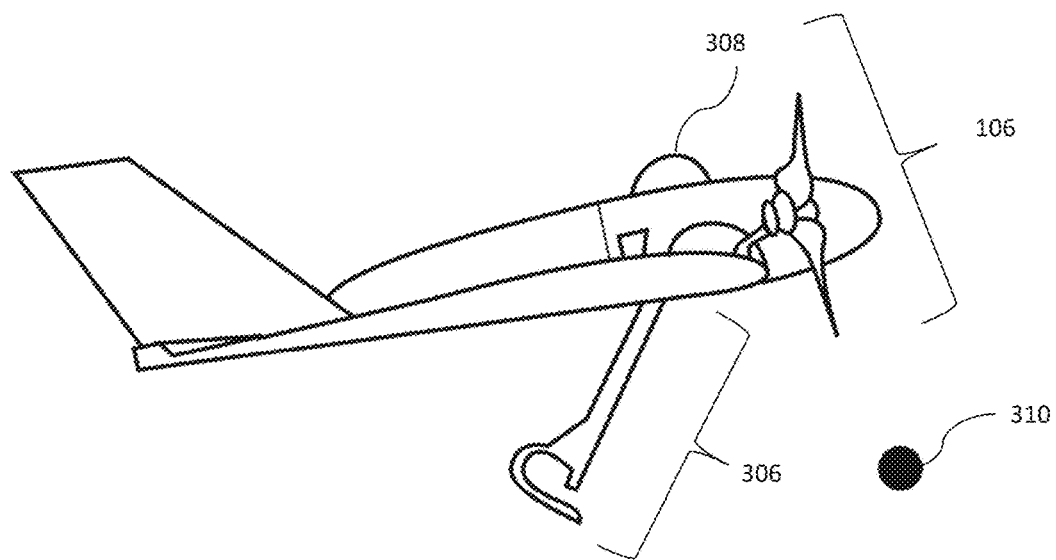
FIGS. 4a through 4d illustrate example cable capture and release maneuvers.

FIGS. 4a through 4d illustrate an example cable capture and release maneuver. In FIG. 4a, once the perching point has been located, the UAV 106 approaches the arresting cable 310, whether a perching cable or charging cable 804, at cruise speed with the arresting devices 306 lowered. The UAV 106 may be equipped with one or more retractable arresting devices 306 on the underside of the UAV 106. The distal end of each arresting device 306 may be provided with a capturing hook 314 (e.g., a capture and release mechanism), such as the passively locking jaw illustrated in FIGS. 5a and 5b. Moreover, to increase lateral stability, it is preferable to capture the arresting cable 310 at two or more points, which may be accomplished by employing two arresting devices 306 or a single apparatus having two or more capturing hooks 314.

Figure 4B:
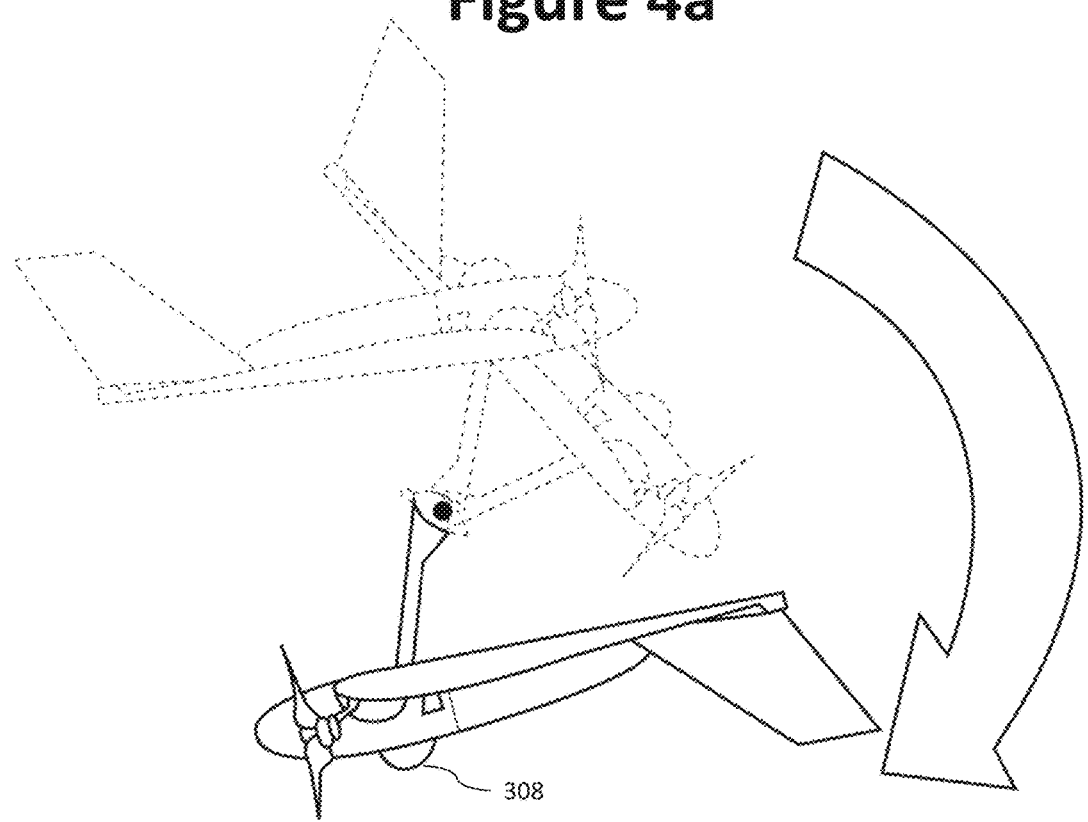

With the arresting device 306 hanging below the UAV 106, aircraft components (e.g., the propeller, ISR pod and tails) do not pose a snagging risk with the arresting cable 310, and an abort maneuver can be performed simply by pitching up and away from the arresting cable 310. As illustrated in FIG. 4b, the arresting device 306 may strike the arresting cable 310 and capture it via the one or more capturing hooks 314. The arresting device 306 may be configured such that an arresting cable 310 may strike at any point along the shank 510 and result in a capture. Once locked, the UAV 106 swings forward and/or down to hang below the arresting cable 310. To increase strength, the arresting device 306 may be secured to the UAV's main structure (e.g., the payload pod 308's attachment brackets) thus transferring arresting loads (e.g., energy) into the main structure of the airframe. Once the UAV 106 is hanging below the arresting cable 310, the payload 308 has an unobstructed view of the surroundings.

Figure 4C:
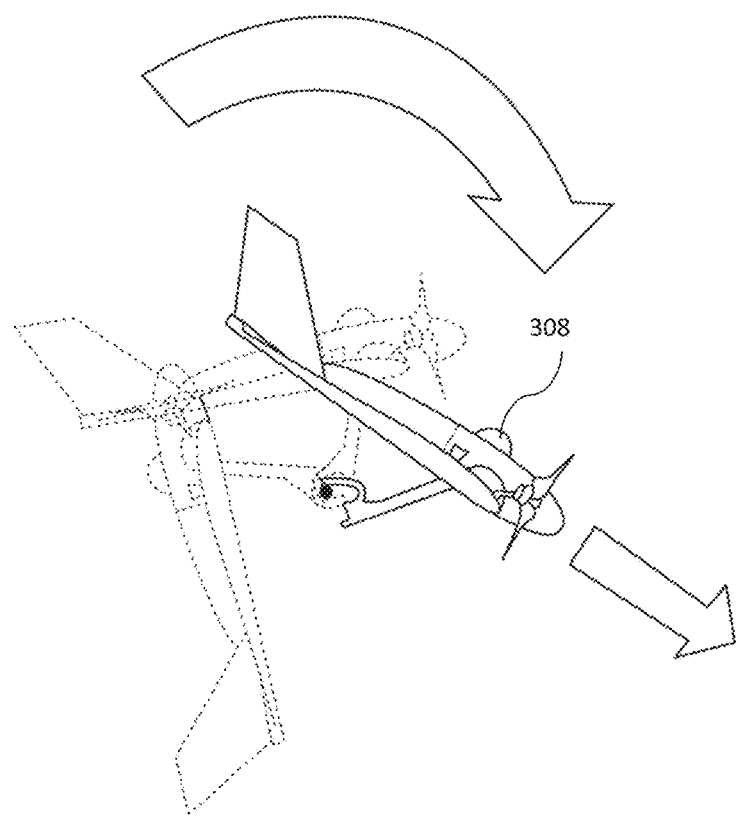
Figure 4D:
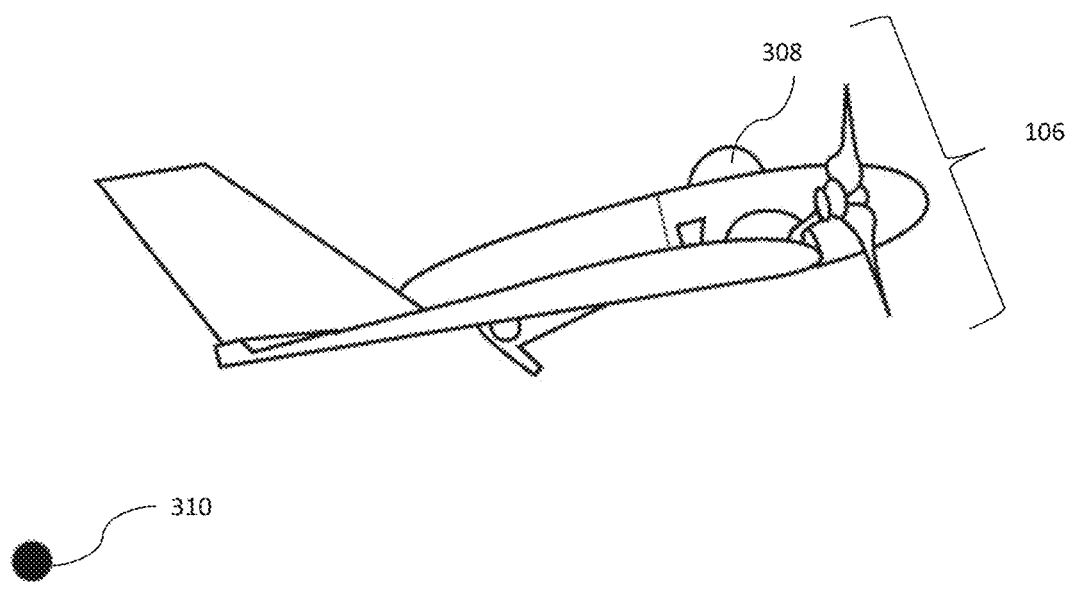

After charging, or surveying an area of interest, the UAV 106 is ready to re-launch. By throttling up the motors to a thrust-weight setting, as illustrated in FIG. 4c, the UAV 106 will rotate around the arresting cable 310 and be pulled into a vertical launch position. At this point, the arresting device 306 will release. By omitting sub-fins, the portion of the airframe behind the arresting device 306 is obstruction free. As illustrated in FIG. 4d, the UAV 106 climbs up and away from the arresting cable 310, transitioning back to a cruise altitude. The arresting device 306 may then retract into the fuselage of the UAV 106 to reduce drag.

Figure 5B:
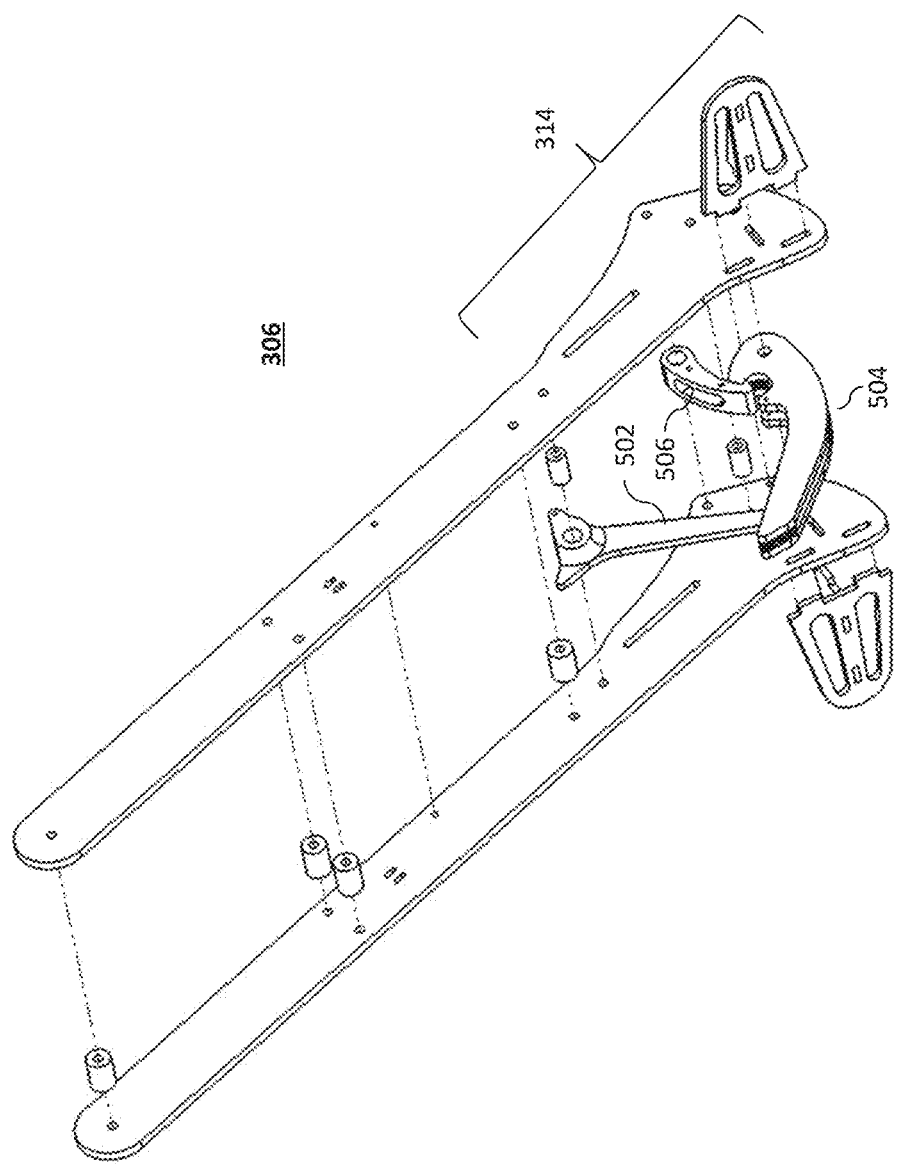

FIGS. 5a and 5b provide an enlarged view of an example arresting device 306 while FIGS. 6a through 6d provide enlarged views of the arresting device 306's capturing hook 314 during the cable capture and release maneuver of FIGS. 4a through 4d. As illustrated, the capturing hook 314 for engaging an arresting cable 310 during capture and release of an aerial vehicle generally comprises a first gate 502 pivotally supported at a first end by a base portion of the shank 510 and movable between (i) a closed position (e.g., FIGS. 6a and 6c-6e) and (ii) an open position (e.g., FIG. 6b) and a second gate 504 pivotally supported at a first end by the base portion of the shank 510 and movable between (i) a closed position and (e.g., FIGS. 6a-6d) (ii) an open position (e.g., FIG. 6e). To prevent the first gate 502 from inadvertently opening, a first return spring 516 biases the first gate 502 in the closed position. Similarly, to prevent the second gate 504 from inadvertently opening, a latch device 514 comprising a movable locking part 506 biased by a return spring 518 to a locked position to lock the second gate 504 in the closed position. When the first gate 502 and the second gate 504 are both in the closed position, the first gate 502 may be configured such that the first gate 502's second end 520 slips within a recess 522 at the second end of the second gate 504, thereby preventing the arresting cable 310 from inadvertently slipping out of the hook recess 512.

More specifically, FIG. 6a illustrates the arresting device 306's capturing hook 314, which is a passively locking jaw resembling a clevis type hook, in a lowered position as the UAV 106 approaches an arresting cable 310 (e.g., a charging cable 804 comprising a wire pair) at cruise speed. FIG. 6b illustrates the capturing hook 314 in the course of catching the arresting cable 310. In operation, the arresting cable 310 may either (i) make direct contact with the capturing hook 314's first gate 502, or (ii) pass along the arresting device 306's shank 510 until it reaches the capturing hook 314's first gate 502. Regardless of the initial contact, once the arresting cable 310 makes contact with the first gate 502, the force of the arresting cable 310 can cause the first gate 502 to push backward in direction C about pivot point Y, thus providing access to the capturing hook 314's hook recess 512. Once the arresting cable 310 is in the hook recess 512 of the capturing hook 314, a force (e.g., an extension spring) may cause the first gate 502 to snap back in direction C, as illustrated in FIG. 6c, thereby securing the arresting cable 310 in the hook recess 512.

Figure 6D:
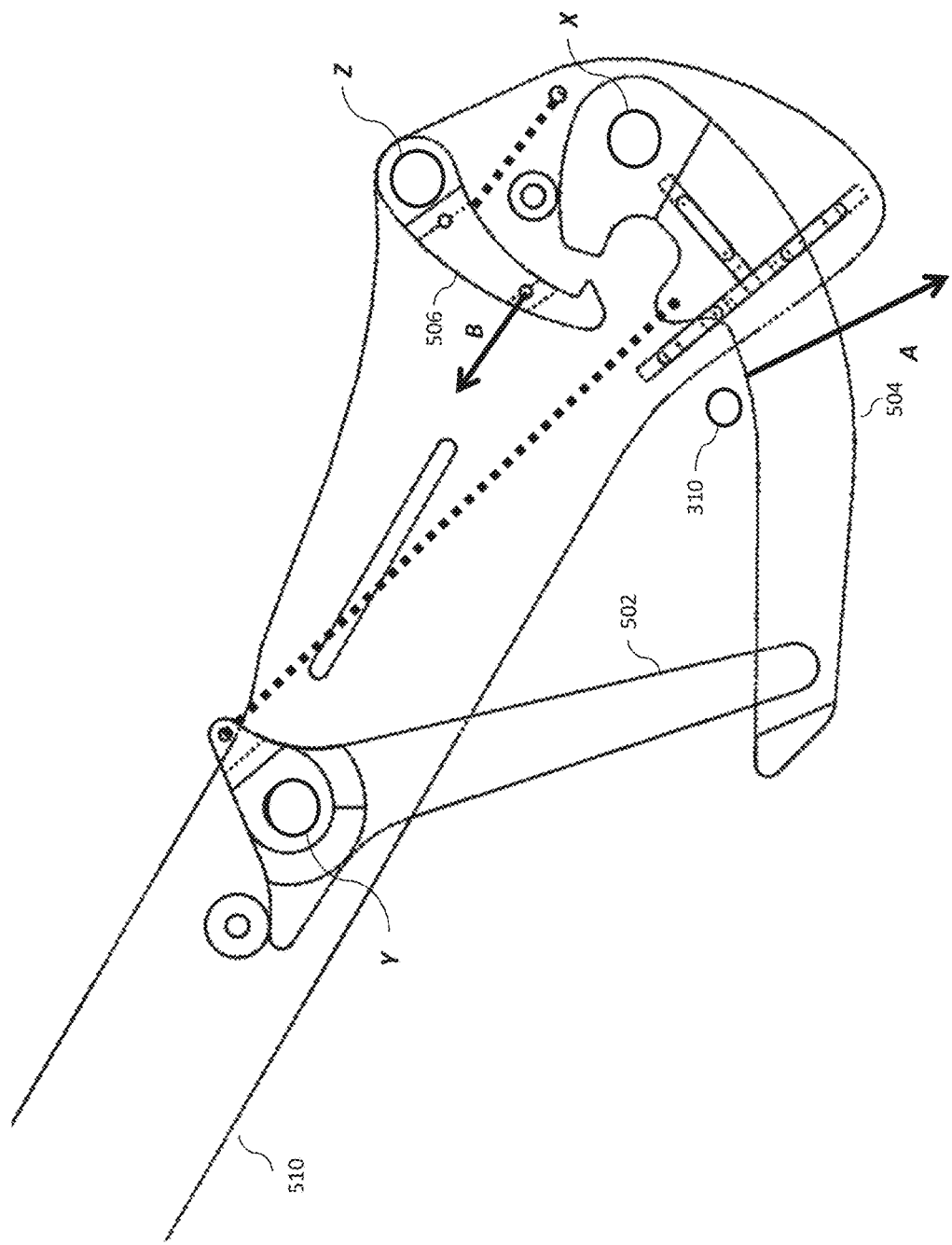

FIG. 6d illustrates the capturing hook 314 prior to releasing the arresting cable 310. While perched and during the takeoff maneuver, the arresting cable 310 generates a force against the second gate 504 in direction A. To release the arresting cable 310 from the hook recess 512, a servo-controlled release wire may be configured related to the latch device 514 by pulling the a movable locking part 506 in direction B about pivot Z, thus enabling the second gate 504 to open by pivoting about pivot point X as illustrated in FIG. 6*d*. As illustrated in FIG. 6*e*, the lift and thrust of the UAV 106 applies a tension to the arresting cable 310 during takeoff that pulls the second gate 504 open thereby releasing the UAV 106 to facilitate free flight, as shown in FIGS. 4*c* and 4*d*. Once released, the force from the arresting cable 310 pulling on the second gate 504 is gone and an extension spring pulls the second gate 504 back into its closed position and allows the latch device 514 to lock it in place, ready for the next capture. The arresting device 306's design eliminates the need for a controls/sensing intensive dynamic perch maneuver. By approaching the arresting cable 310 at or near cruise speed, the UAV 310 can be much less susceptible to gusts, and the controls approach can be greatly simplified (i.e. not in the post-stall regime). The arresting device 306's design enables the Continuous Operation System 100.

Figure 7:
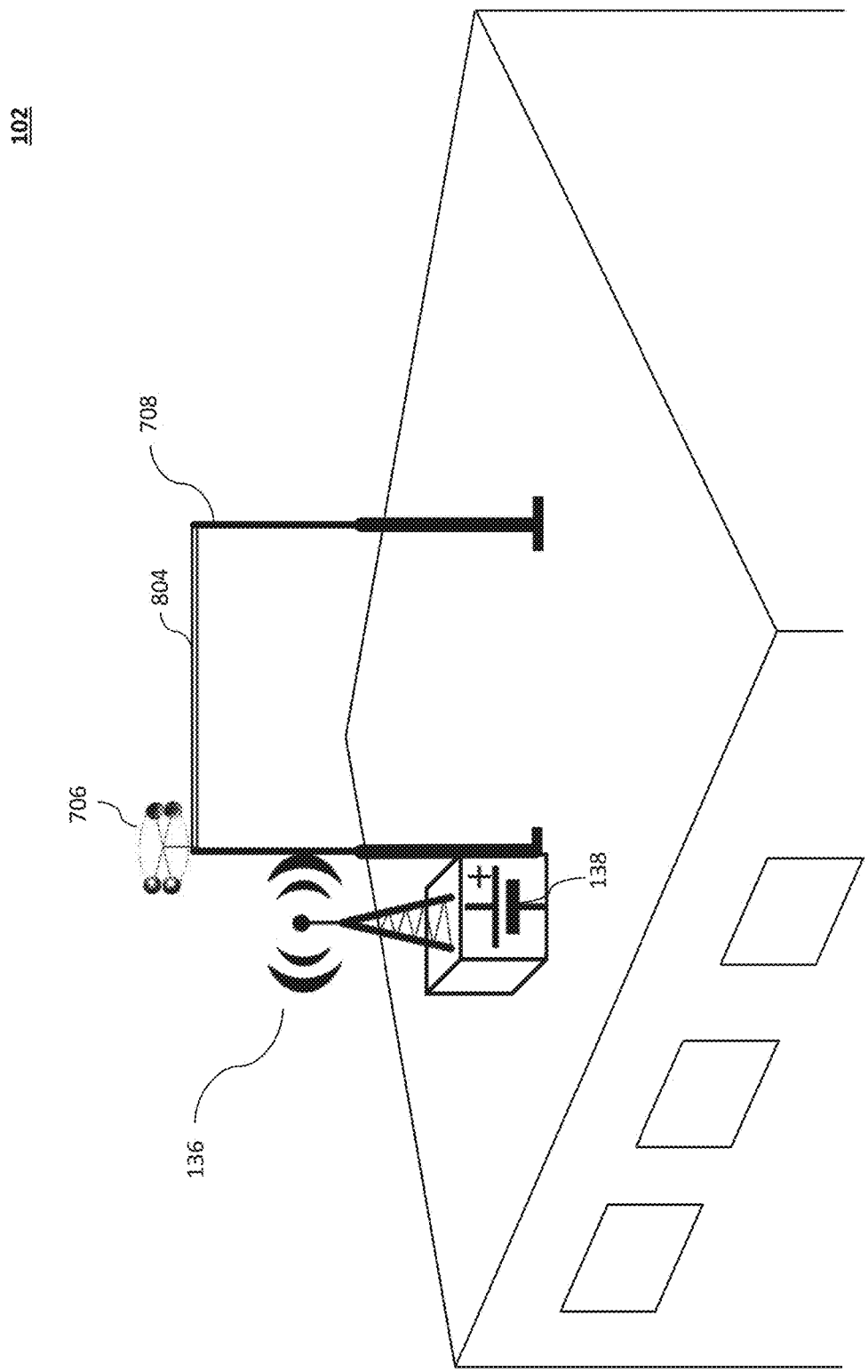
FIG. 7 illustrates a Ground Control Station 102 positioned on a rooftop.

As illustrated in FIG. 7, a Ground Control Station 102 may be positioned on a rooftop, or other substantially clear area (e.g., clear from landing/takeoff obstruction) near the area of surveillance. Once a Ground Control Station 102 has been configured, a Waypoint Location 104 having an arresting cable 310 (e.g., power, telephone or specially-installed cable) for the UAV 106 may be identified or created. Since the arresting cable 310 may be pre-surveyed, an operator can designate an approach direction; the GPS coordinate location and/or altitude of the perching zone (e.g., the area immediately surrounding the arresting cable 310). The arresting cable 310 may also be marked or equipped with markers, such as IR beacons, that allow the UAV 106 to locate the arresting cable 310 using its onboard sensory system. After surveying and marking an arresting cable 310 within a perching zone, the UAV may approach and land on the arresting cable 310.

Since the UAV 106's operation is autonomous, the UAV 106 may be configured to launch from a Ground Control Station 102, fly a mission (e.g., perch at a Waypoint Location 104), then return to the Ground Control Station 102 to charge itself in preparation for the next autonomous launch. To facilitate this functionality, a Ground Control Station 102 may provide a charging cable 804 for electrically connecting to the UAV 106 to facilitate charging after the UAV 106 has perched on the charging cable 804. A diagram of an example Ground Control Station 102 is illustrated in FIG. 7.

To facilitate autonomous takeoff and capture (landing), a Ground Control Station 102 may comprise a charging cable 804, a communications transceiver 136 and wind gauge 704. The charging cable 804 may be supported by one or more dedicated posts 708. Accordingly, the Ground Control Station 102 may be configured to be self-supporting so that it may stand on its own in an open field. Alternatively, the charging cable 804 may be coupled with independent structures, such as buildings, telephone poles, etc. In fact, the entire Ground Control Station 102 may be coupled with, or integrated with, a vehicle to provide a mobile Ground Control Station 102 where the UAV 106 can locate the Ground Control Station 102 via the wireless antenna and/or GPS tracking. Similarly, the wind gauge 704 may be integrated with the Ground Control Station 102 via an I/O device 140 to provide wind data (e.g., speed and direction) or remotely located wherein the wind data is communicated to the Ground Control Station 102 via communications transceiver 136. Regardless of the configuration, to account for landing and takeoff maneuvers, the charging cable 804 should be designed and positioned sufficiently off the ground to provide an adequate amount of landing length for the UAV. For example, the charging cable 804 length may be 15 feet and positioned substantially parallel to the ground at a height of 15 feet.

A notable feature of the charging cable 804 is that it may directly electrically interface with the capturing hook 314 to facilitate charging the UAV 106's battery while perched on (e.g., hanging from) the charging cable 804. Specifically, the charging cable 804 preferably comprises conductive wires (e.g., ground and power) that interface with the UAV 106's battery system via the capturing hook 314. In doing so, the conductive wires should be configured to minimize the risk of shorting (e.g., making contact with each other) directly, or through some part of the UAV 106's hook, once the UAV has perched and is hanging in steady state.

A cable management system for use in Ground Control Station 102 according to the present invention may be illustrated by the following example. This example is provided to aid in the understanding of the invention and is not to be construed as a limitation thereof. As illustrated in FIG. 8, two extendable (e.g., telescoping) poles 802 may be spaced apart and extended into the air. For a small UAV 106, the poles 802 may be spaced 15 feet apart and extend 15 feet into the air. To tether the poles 802 to the ground, a first end of two or more guy-lines 804 may be coupled to the top of each pole 802 via one or more mounts while a second end may be coupled to one or more ground attachment points 806 (e.g., ground stakes). While the guy-lines 804 may be constructed from rope, cable may be employed to reduce any displacement resulting from guy-line stretching. The mount for the guy-lines may be configured such that each guy-line may attach to its own mount with some distance between them, thus adding moment resistance to the setup, thereby reducing twisting of the poles 802. Moreover, ratcheting tensioning devices may be provided in line with the guy-line to facilitate larger adjustments while turnbuckles may be provided to facilitate fine adjustments.

A charging cable 804 may be stretched between the poles 808 to capture and charge a UAV 106. The charging cable 804 may be further threaded through one or more pulleys 808 and coupled to one or more cable management devices 810. Each cable management device 810 may be configured to provide a constant charging cable 804 tension augmented by a shock absorber to absorb energy during UAV capture. Indeed, the charging cable 804 should be configured as to provide a soft catch to the UAV 106, thereby minimizing the risk of damage after repeated use. Example cable management devices 810 may include, for example, a winch coupled with one or more shock absorbers, springs (linear or torsional), elastic cables, or hydraulics. To increase reliability, the cables may be kept on the pulleys with cable guards or routed through cable housings.

While the following example is applied to a charging cable 804, the same functionality may be used in conjunction with any perch point, such as an arresting cable 310 positioned at a Waypoint Location 104. For example, as discussed above, the charging cable 804 may be marked with two or more markers 812, such as active IR beacon and/or retro-reflective tape. The markers 812 may be attached to the charging cable 804 to enable the UAV 106 to detect relative bank angle compared to the charging cable 804, relative pitch and heading as well as to estimate a rough distance to target. The UAV 106's onboard vision based navigation system can centroid the incoming images to determine the centers of the IR beacons in the field of view, thereby identifying the charging cable 804. The vision navigation algorithm is continually trying to identify a target. When a possible target is recognized, an internal counter verifies that it has been continually identified for several frames. Upon recognition of the beacons, a signal is sent to the outer-loop controller and the vehicle guidance is switched into a vision-based tracking routine. Specifically, heading and altitude commands may track the location of the target to the center of the field of view. The target was set as the central markers, detected by the vision based navigation system algorithms where offsets in the lateral direction commands heading, and vertical offset commands altitude. Accordingly, a low level altitude and heading tracker was implemented in the autopilot.

Accordingly, the general objective of a vision based navigation system is to determine the estimation and control approach for a UAV 106 flying towards an identified visual source and using the information of the observed location of two or more known markers 812 in the camera frame to reach a specific location (e.g., a Ground Control Station 102 or Waypoint Location 104). Measurements available to the vision based navigation system may include, for example, position data from a GPS device, attitude with respect to a global reference frame (e.g., using VectorNav) and the location of predetermined points in the camera frame (e.g., using Sanford image processing). Markers 812 or other beacon points may be located in the environment and the MAV may be provided with data regarding the markers 812's location with respect to the charging cable 804. For example, the specific location should be visually accessible to the camera at least up to a point where the UAV 300 may achieve a final approach with increased certainly. That is, as the UAV 300 gets closer to the specific location, the markers 812 should fall within the field of view of the camera up to a very short distance to the target location. The markers 812 are known, or assumed, to be located at some predetermined points on the cable.

Figure 9A:
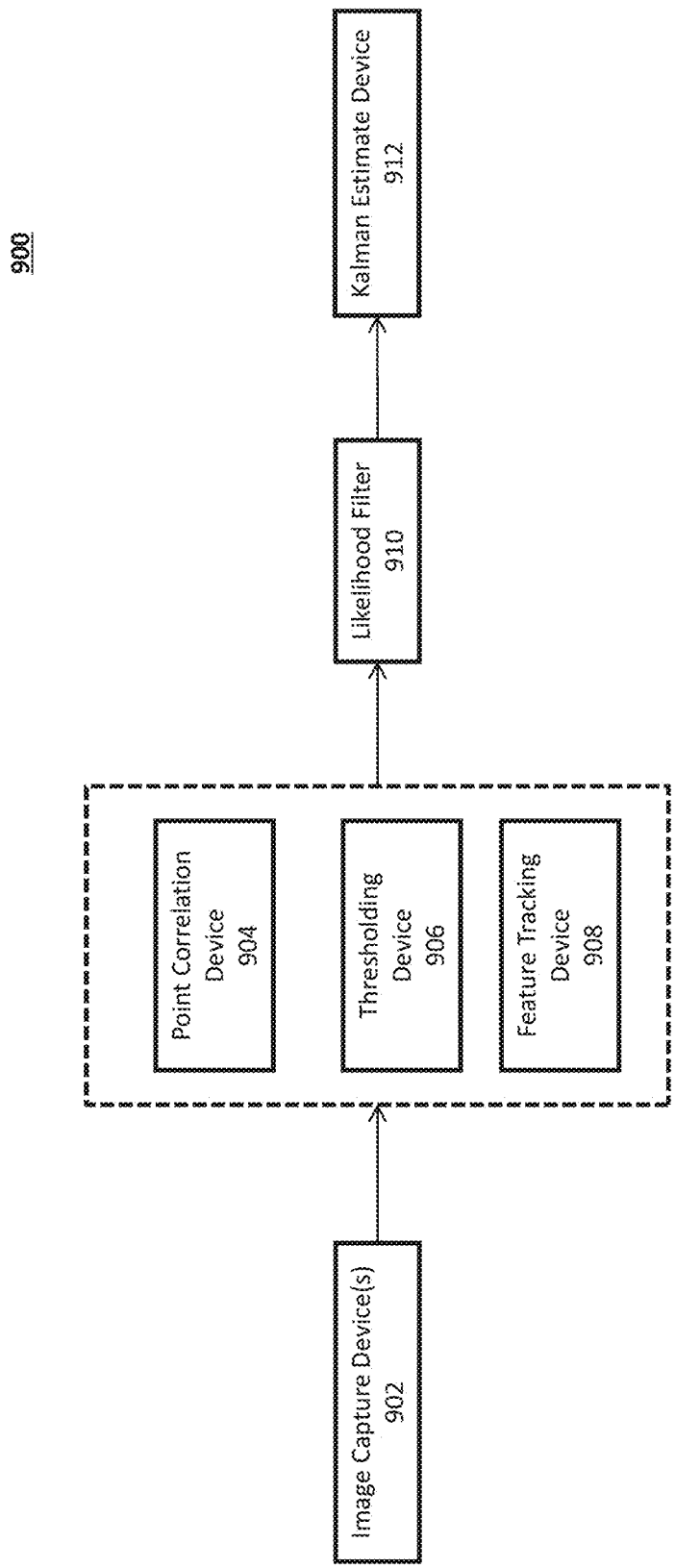
FIG. 9a illustrates a block diagram of an example vision-based navigation system.

FIG. 9a illustrates a block diagram of an example vision based navigation system 900. As illustrated, the vision based navigation system 900 may comprise one or more image capture devices 902, a point correlation device 904, a thresholding device 906, a feature tracking device 908, a likelihood filter 910, and a Kalman estimate device 912.

The one or more image capture devices 902 may be configured to receive, or generate, an image of an area. The one or more image capture devices 902 may include, for example, an onboard camera. The image of the area may be a still photo or a video, which generally comprises a series of still photos known as frames. The thresholding device 906 may be configured to determine the location of features within the image. For example, markers 812 may be used to provide image points with high intensity levels that can be extracted from the image by thresholding. Accordingly, the information from the image capture devices 902 (e.g., camera) can provide the coordinates (u,v) for points within a corresponding threshold. For example, a detected light that exceeds a predetermined threshold intensity value may be represented as a coordinate within the image. The feature tracking device 908 may employ a feature tracking algorithm, such as Lukas-Kanade, to calculate the motion of the image locally using the coordinates by tracking the motion of a feature (e.g., a coordinate) from frame to frame. This process allows for filtering out coordinates that do not correspond to the markers 812 as they are tracked. However, additional calculations may further be employed to track of the markers, or other features. Specifically, an algorithm may track features over different frames but may not identify which ones are the markers.

Figure 9B:
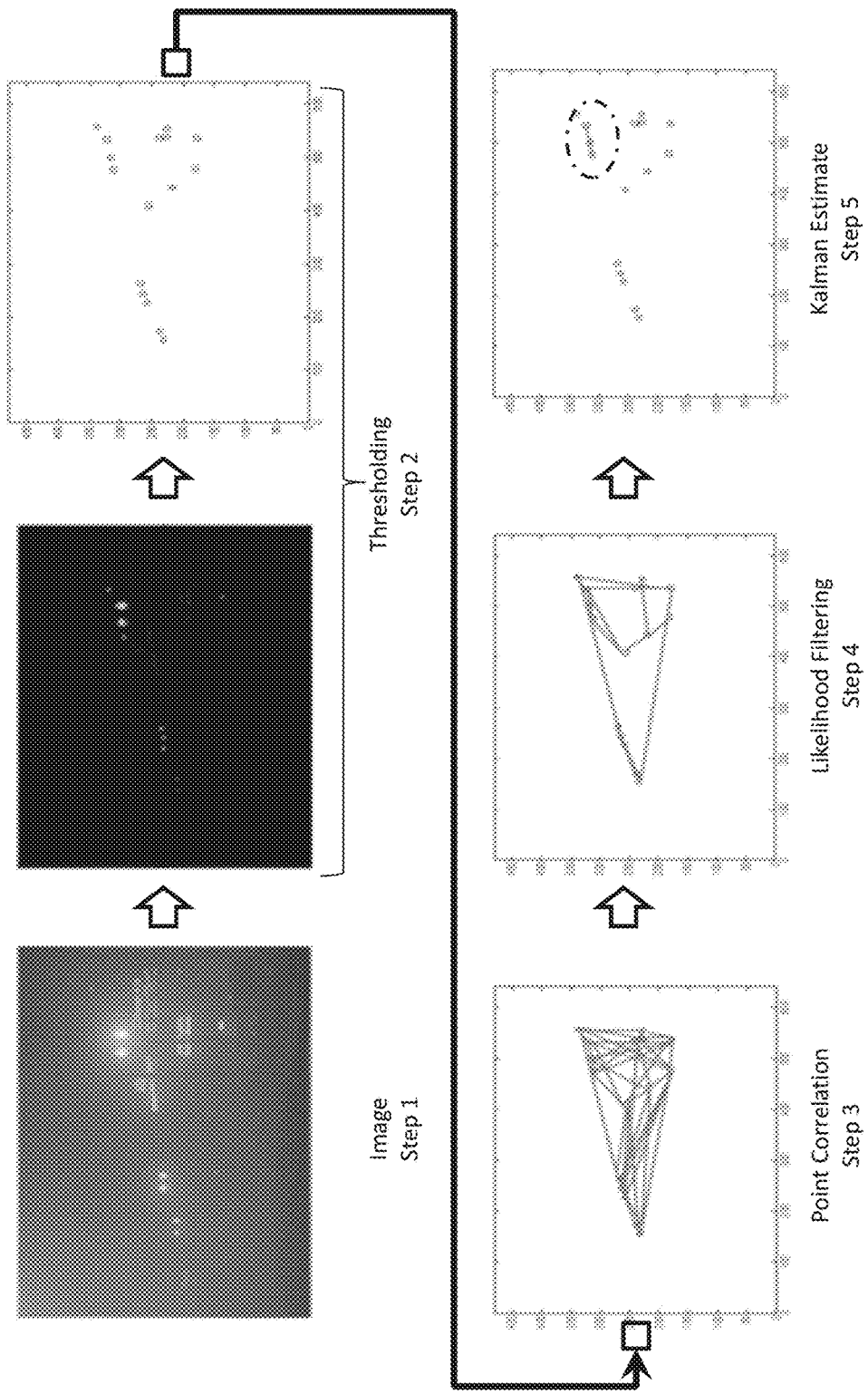
FIG. 9b illustrates an example process of analyzing an image using a vision-based navigation system.

The point correlation device 904 and likelihood filter 908 may be used to reduce the coordinates by eliminating outlier coordinates based on, for example, a linear correlation. Since the locations of the markers is typically known (e.g., on a power line), the markers should meet a known geometric constraint. Accordingly, a first approach may be to assume that a valid set of points should lie on a line (or close to it) as shown in FIG. 9b. Therefore for vision based navigation system 900 selected n-sets of points, the likelihood filter 908 can determine whether the points are within a threshold of being in a line by checking the error from a linear fit. From here, there are two possible approaches to beacon detection: one based on closed-loop, time-varying thresholding and a Kalman Filter-based approach. The Kalman estimate device 912 comprises a Kalman filter, which uses input from GPS, the IMU and the Camera to produce the best estimate of the position and/or attitude with respect to the markers. Generally speaking, a Kalman filter is an algorithm that uses a series of measurements observed over time, containing noise (random variations) and other inaccuracies, and produces estimates of unknown variables. Moreover, the routine may identify features that are consistent over time in spite of the time-varying brightness threshold to eliminate noise and reflections that are less consistent in brightness over time. A standard Extended Kalman Filter approach is used to predict the state and update the covariance:

$$\hat{x}_{k|k-1} = f(\hat{x}^+_{k-1|k-1}, u_{k-1})$$

$$P_{k|k-1} = F_{k-1} P_{k-1|k-1} F_{k-1}^T + Q_k$$

To filter out sources of noise, reflections, and non-beacon lights, a closed-loop thresholding algorithm may be used to alters the brightness threshold in real-time to select a subset of points (e.g., 5 or so). The closed-loop thresholding algorithm may work in conjunction with the likelihood filter that may have more time-varying brightness levels than the beacons themselves.

FIG. 9b illustrates an example process of analyzing an image using a vision based navigation system 900. At step 1, the vision based navigation system 900 generates, or otherwise receives, an image of a given area. The area may be the view of the UAV 300 during flight (e.g., akin to the view from a manned aircraft's cockpit). The camera parameters may be assumed, such as focal length and camera configuration.

At step 2, a series of coordinates are identified based on the image using thresholding techniques. Specifically, the various light sources detected in the image are represented using one or more coordinates on a coordinate plane. The light sources are represented on the plane when they exceed a predetermined threshold intensity value. As illustrated, in addition to the two markers, the various street lamps also exceed the threshold intensity and thus are similarly represented on the coordinate plane. Using intense beacons will provide image points with high intensity levels that can be extracted from the image by thresholding. The information from the camera will provide the (u,v) coordinates for points within a corresponding threshold. The measurement model used is the standard pinhole model:

$$u = \frac{X_f}{Z}$$

$$v = \frac{Y_f}{Z}$$

a convenient way used to express this model is:

$$p = \lambda \begin{pmatrix} u \\ v \\ 1 \end{pmatrix} = \begin{pmatrix} f & \tau & o_x \\ 0 & \eta f & o_y \\ 0 & 0 & 1 \end{pmatrix} \begin{pmatrix} X_{cam} \\ Y_{cam} \\ Z_{cam} \end{pmatrix} = K X_{cam} \qquad 5$$

Where $\tau, \eta, o_x, o_y$ are parameters of the camera describing distortion and offset. As mentioned in the assumptions, $\tau, \eta$, will be considered 0, 1 (no shear or compression distortion). The location of a point $p_A$ in the camera frame can then be calculated as:

$$\lambda p_A = KR(-X+x_A) \qquad (1)$$

with:

$$\lambda = R_3(-X+x_A) \qquad (2)$$

Where $$R = \begin{bmatrix} R_1 \\ R_2 \\ R_3 \end{bmatrix}$$

is the rotation matrix from the absolute frame to the camera frame:

$$R = R_{cam/body} R_{body/X}$$

Where, X is the coordinates of the camera with respect to the target location, and $x_A$ is the location of the beacon with respect to the target location. The gradient of the measurement equation H can be calculated by implicit differentiation of equations (1) and (2) to be:

$$H_{k\_p} = \frac{\partial p_A}{\partial X}\bigg|_{\hat{x}_k} = -\frac{1}{\lambda}(KR + p_A R_3^T)\bigg|_{\hat{x}_k} \qquad (3)$$

At step 3, a RANdom SAmple Consensus (RANSAC) algorithm may sample different combinations of n-points. At step 4, the coordinates are reduced by eliminating outlier coordinates based on a known geometric constraint, for example, a linear correlation. That is, outliers that correspond to 3D points reflecting or emitting IR that may not be discerned from the correct beacons to be tracked. Thus, a preliminary filter that can reduce the data points by rejecting outliers is based on a linear correlation. Since the beacons are known to be located on a power line, they should meet a specific geometric constraint. As a first approach we will assume that a valid set of points should lie on a line (or close to it). Therefore for every selected pair of points we can check if they are within a threshold of being in a line by checking the error from a linear fit. After the image processing, we have a set of points:

$$P_k: \{p_{k1}, p_{k2}, p_{k3}, p_{k4}, p_{k5}, \ldots\}$$

Which we can group into sets that represents mutually exclusive events:

$$Z_k: \{z_k^1, z_k^2, z_k^3, z_k^4, z_k^5, \ldots\}$$

That is:

$$z_k = \begin{bmatrix} \hat{p}_A \\ \hat{p}_B \\ \hat{p}_C \end{bmatrix}_k = \begin{bmatrix} p_{k1} \\ p_{k2} \\ p_{k3} \end{bmatrix} \text{ or } \begin{bmatrix} p_{k2} \\ p_{k1} \\ p_{k3} \end{bmatrix} \text{ or } \begin{bmatrix} p_{k1} \\ p_{k2} \\ p_{k4} \end{bmatrix} \text{ or } \begin{bmatrix} p_{k1} \\ p_{k4} \\ p_{k2} \end{bmatrix} \ldots$$

Finally, at step 5, the markers, indicated in the figure using a dotted circle, are identified using likelihood filtering and/or Kalman filter. Indeed, a standard Extended Kalman Filter approach may be used to predict the state and update the covariance:

$$\hat{x}_{k|k-1} = f(\hat{x}^+_{k-1|k-1}, u_{k-1})$$

$$P_{k|k-1} = F_{k-1} P_{k-1|k-1} F_{k-1}^T + Q_k$$

Each point $z_k$ indicates a combinatorial of feature points, which indicate mutually exclusive events. Therefore, we are interested in selecting one of the possible events as the correct one. This may be accomplished by selecting the one with the largest likelihood as measured by the innovation vector and its covariance. After performing the state prediction, we can look for the event $z_{k^n}$ that maximizes the likelihood by projecting the innovation of each event (variation from predicted state) in its probability space, and finding distance to the origin (maximum likelihood). This is equivalent to finding the event n that minimizes:

$$e_{k^n} = \tilde{y}_{k^n}^T S_k^{-1} \tilde{y}_{k^n}$$

With:

$$\tilde{y}_{k^n} = (z_{k^n} - h(\hat{x}_{k|k-1}))$$

$$S_k = H_k P_{k|k-1} H_k^T + R_k$$

After selecting the measurement with highest likelihood, the filtered data point is used in the update of the Kalman State estimate:

$$K_k = p_{k|k-1} H_k^T S_k^{-1}$$

$$\hat{x}_{k|k} = \hat{x}_{k|k} + K_k \tilde{y}_{k^n}$$

$$P_{k|k} = (I - K_k H_k) P_{k|k-1}$$

One the markers are identified, the UAV 300 may navigate to the arresting cable 310's perch point using an onboard autopilot. For example, a terminal guidance control approach may be employed. Using this approach, assumptions may be used to reduce the complexity of an approach. Specifically, one assumption may be that the UAV 300 can initially identify the beacons on the camera plane, that is, the points in the image that correspond to the beacons are known. Additionally, given the ambiguity of the measurements we have to make some assumptions of states that will be controlled through internal loops.

Figure 11:
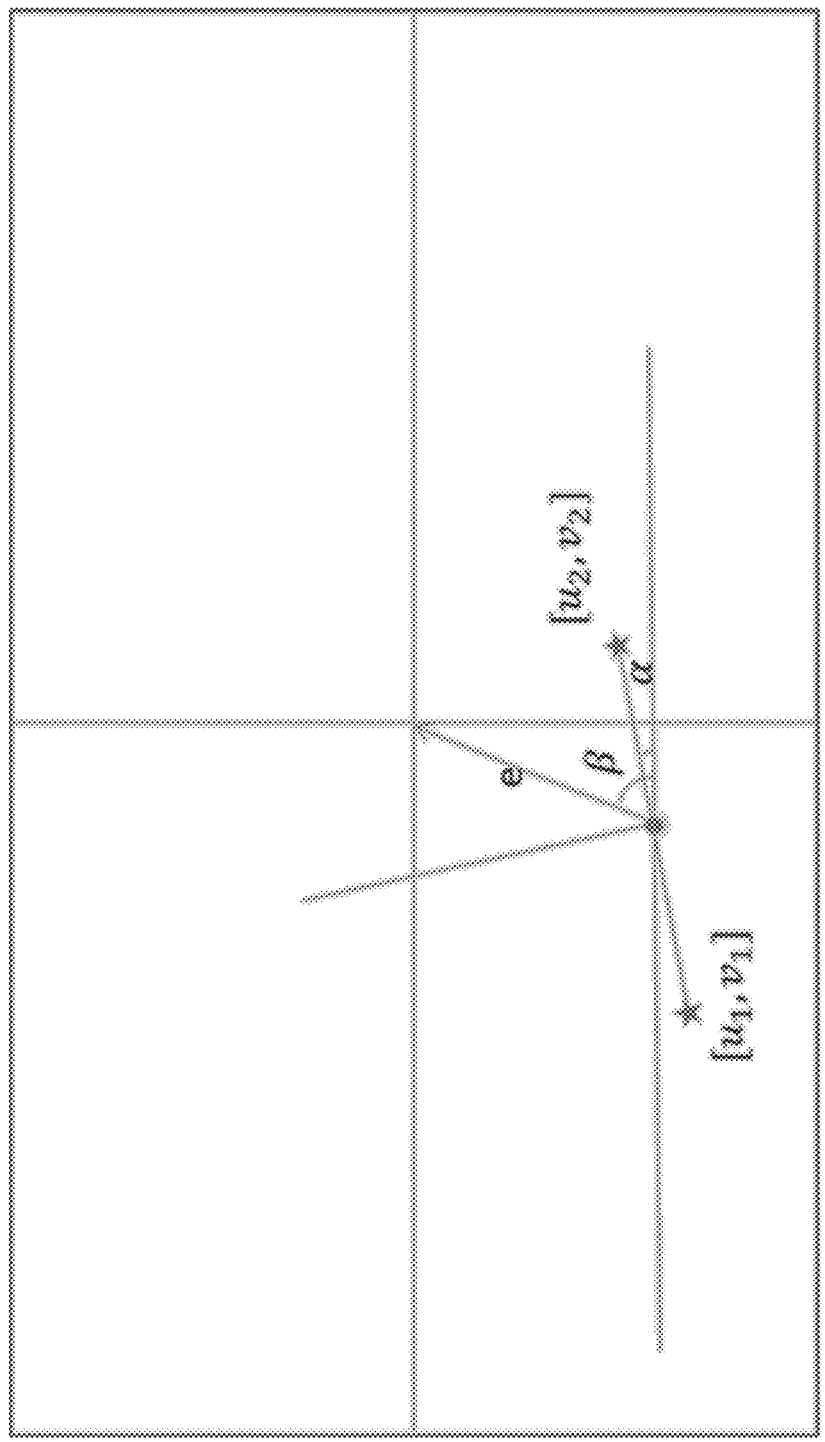
FIG. 11 illustrates the geometry of the guidance elements in the camera frame.

The beacons may also be tracked from image to image by finding the set that maximizes the probability of being the same beacon from the previous frame by calculating the set that minimizes:

$$e = dp^T R^{-1} dp$$

Where $dp = (du, dv)$ is an array of the difference in the measured positions between the identified beacons in one frame, and the detected points in the next one, R is the covariance matrix of the measurements. Using that information, a line in the image may be defined by two points. In general, the information from the camera in FIG. 11 may be used, which illustrates the geometry of the guidance elements in the camera frame. The guidance elements are:

$$\alpha = \operatorname{atan}\left(\frac{v_2 - v_1}{u_2 - u_1}\right)$$

$$\beta = \operatorname{atan}\left(\frac{v_2 + v_1}{u_2 + u_1}\right)$$

$$\gamma = \beta - \alpha$$

$$e_\theta = |e|\cos\gamma - |e|\sin\gamma$$

$$e_\psi = |e|\sin\gamma + |e|\cos\gamma$$

$$|e| = \frac{1}{2}\sqrt{(u_2 + u_1)^2 + (v_1 + v_2)^2}$$

Where $p_i = [u_i, v_i]$, $i \in (1,2)$, is the location of the line extreme points on the camera frame. The control transfer functions K(s) can be a set of static gains or a dynamic transfer functions set to compensate the dynamics of the non-linear input to output system.

A first approach may be a constant pitch angle approach. To perform this approach it may be assumed that an internal loop tries to maintain a constant pitch angle, the altitude variations are small, and the altitude is regulated using thrust. Thus, in general, Pitch angle is constant. Small variations with respect to the level direction. (Defining level direction as vector from camera to target point is aligned). Under the constant pitch angle assumption we can define an input-output system:

$$\begin{bmatrix} e_\theta \\ e_\psi \\ \alpha \end{bmatrix} = G \begin{pmatrix} h \\ \psi \\ \phi \end{pmatrix}$$

Control approach will then be based on trying to regulate the altitude, heading and roll based on the observed line (defined by the extreme points) in the image.

$$\begin{bmatrix} \dot{h} \\ \dot{\phi} \end{bmatrix} = \begin{bmatrix} K_{h\theta}(s) & 0 & 0 \\ 0 & K_{\psi\alpha}(s) & K_{\phi\alpha}(s) \end{bmatrix} \begin{bmatrix} e_\theta \\ e_\psi \\ \alpha \end{bmatrix}$$

Where $\theta$, $\psi$, $\rho$ are pitch yaw and roll angles respectively.

A second approach may be control of velocity vector. An objective of the control law is to maintain the camera vector aligned with the final target point, given the assumption that the camera vector is aligned with the velocity direction, the trajectory converges to the target.

$$\begin{bmatrix} e_\theta \\ e_\psi \\ \alpha \end{bmatrix} = G \begin{pmatrix} h \\ \psi \\ \phi \end{pmatrix}$$

The velocity of the vehicle is aligned with the camera vector. This can be performed by providing inner control loops that regulate the thrust to achieve such behavior.

$$\begin{bmatrix} \dot{\theta} \\ \dot{\psi} \\ \dot{\phi} \end{bmatrix} = \begin{bmatrix} K_{\theta 1}(s) & K_{\theta 2}(s) & 0 \\ K_{\psi 1}(s) & K_{\psi 1}(s) & 0 \\ K_{\phi 1}(s) & 0 & K_{\phi 2}(s) \end{bmatrix} \begin{bmatrix} e_\theta \\ e_\psi \\ \alpha \end{bmatrix}$$

Where $\theta$, $\psi$, $\rho$ are pitch yaw and roll angles respectively.

A third approach may be glideslope. This approach considers a glideslope defined by an estimated distance to the target from the size of the line in the camera plane and assumes that the pitch angle is held constant.

$$h = 1 - \frac{(|p_2 - p_1|)}{Y_{max}}$$

Inner loops may be employed to achieve the glideslope.

Figure 10A:
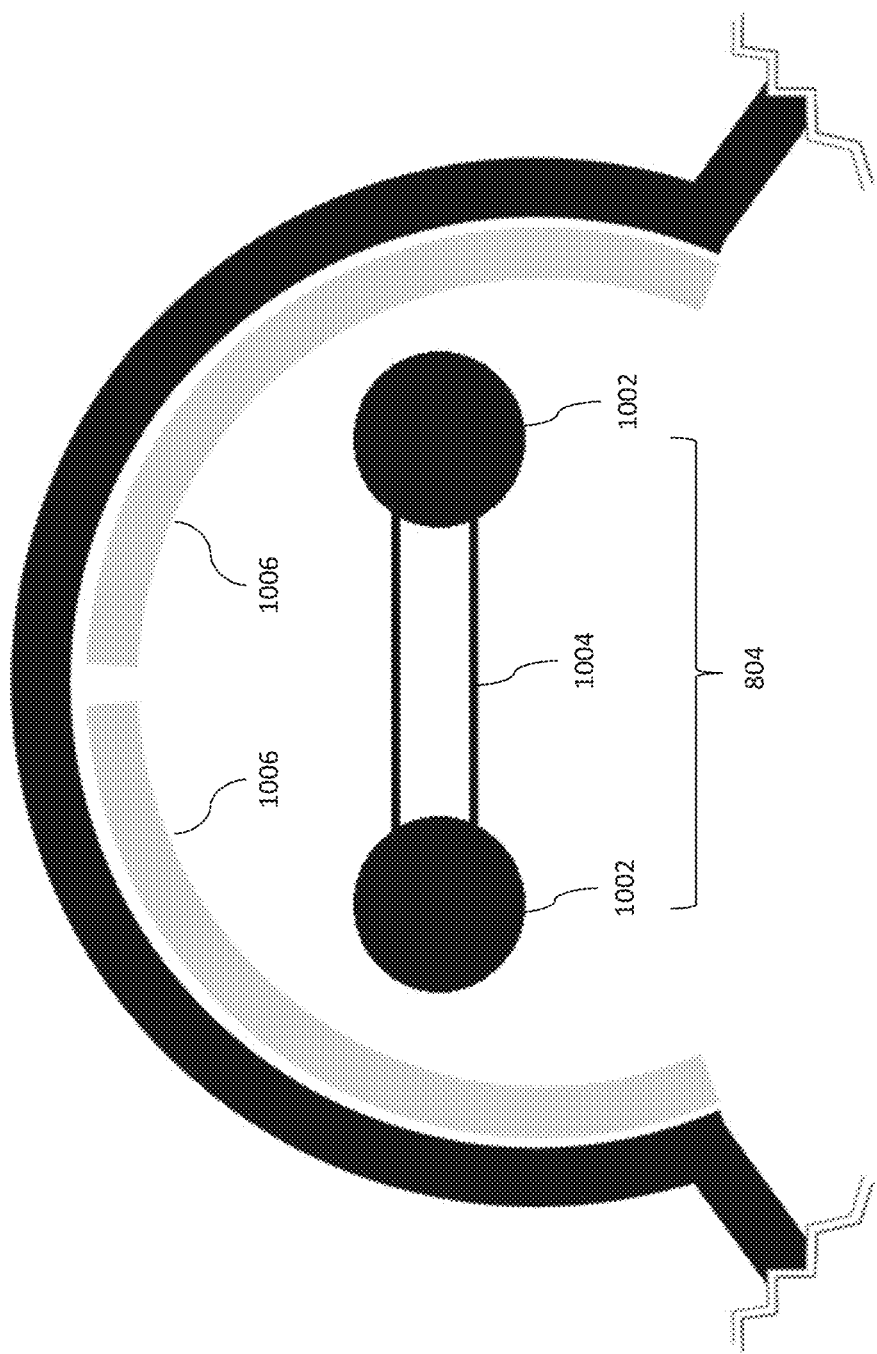
FIG. 10a illustrates a cross-sectional view of a charging cable electrically coupling with a conductive contacts.

FIG. 10a illustrates a cross sectional diagram of an example charging cable 804 comprising two conductive wires 1002 separated by an non-conductive insulator 1004, which resembles a twin lead RF cable. To reduce the risk of shorting the circuit, the arresting device 306 and capturing hook 314 may be fabricated from a non-conductive material equipped with conductive contacts 1006 positioned in the hook recess 510 of the capturing hook 314 to facilitate an effective electrical contact between the UAV 106's battery charging system and the wire conductors 1002. An example non-conductive material includes synthetic polymers, such as plastic. To increase conductivity and prevent corrosion, the conductive contacts 1006 may be fabricated from a non-corrosive conductor, such as gold. Providing wider conductive contacts 1006 allows for a large amount of angular movement of the UAV 106 on the cable while maintaining electrical contact.

Figure 10B:
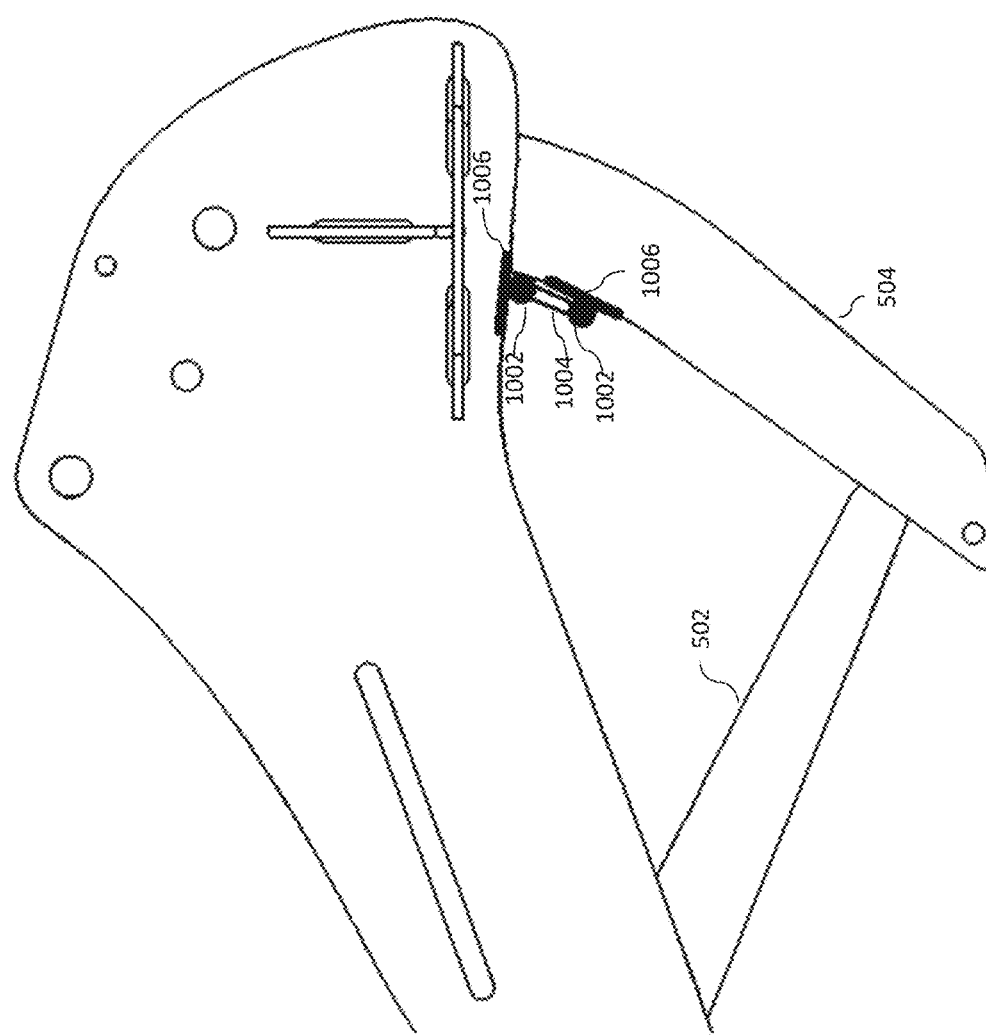
FIG. 10b illustrates an example configuration for positioning conductive contacts on an arresting device capturing hook.

FIG. 10b illustrates an example configuration for positioning conductive contacts 1006 on the arresting device 306's capturing hook 314 of FIGS. 6a through 6e. For example, a first conductive contact 1006 may be placed on the second gate 504, and a second conductive contact 1006 may be placed on the base portion of the shank 510. Specifically, the first and second conductive contacts 1006 should be placed at or near the point where the second gate 504 meets the base portion of the shank 510, such that each of the arresting cable 310's conductive wires 1002 may be electronically coupled with its respective conductive contact 1006. To account for conductive contact 1006 placement, the non-conductive insulator 1004's width may be increased or decreased to ensure sufficient contact between each conductive wire 1002 and an associated conductive contact 1006.

Although the present invention has been described with respect to what are currently considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, articles, brochures and other published documents discussed above are hereby incorporated by reference into the Detailed Description of the Preferred Embodiment.

What is claimed is:

1. An aerial vehicle having a vision-based navigation system for capturing an arresting cable situated at a landing site, the aerial vehicle comprising:
 a fuselage having a propulsion system;
 an arresting device coupled to the fuselage, the arresting device to capture said arresting cable at the landing site;
 a camera situated on the aerial vehicle;

an infrared illuminator situated on the aerial vehicle to illuminate the landing site, wherein said arresting cable has two infrared reflectors situated on said arresting cable; and an onboard processor to (i) generate a plurality of coordinates representing features of the landing site using an image thresholding technique, (ii) eliminate one or more coordinates as outlier coordinates using linear correlation, (iii) identify two of the plurality of coordinates as associated with the two infrared reflectors using a Kalman filter, and (iv) navigate the aerial vehicle toward said two of the plurality of coordinates associated with the two infrared reflectors to enable the aerial vehicle to capture said arresting cable situated at the landing site.

2. The aerial vehicle of claim 1, wherein the onboard processor identifies a perching point on said arresting cable using said two of the plurality of coordinates.

3. The aerial vehicle of claim 2, wherein the aerial vehicle charges an onboard battery using power received from said arresting cable via said arresting device.

4. A vision-based navigation system for installation on an aerial vehicle, the vision-based navigation system comprising:

a camera;

an illuminator situated on the aerial vehicle to illuminate a landing site, wherein the landing site comprises an arresting cable with two reflectors situated on the arresting cable;

an onboard processor to identify a perching point at the landing site, wherein the onboard processor identifies the perching point by (i) generating a plurality of coordinates representing features of the landing site using an image thresholding technique, (ii) identifying among said plurality of coordinates a coordinate associated with each of said two reflectors, and (iii) navigate the aerial vehicle toward the identified coordinates associated with each of said two infrared reflectors to enable the aerial vehicle to capture the arresting cable situated at the landing site.

5. The vision-based navigation system of claim 4, wherein the onboard processor is configured to identify said coordinate for each of said two reflectors using a Kalman filter.

6. The vision-based navigation system of claim 4, wherein the onboard processor eliminates outlier coordinates from said plurality of coordinates using linear correlation.

7. The vision-based navigation system of claim 4, wherein the onboard processor is configured to calculate a distance and a relative bank angle relative to the arresting cable.

8. The vision-based navigation system of claim 4, wherein the onboard processor is configured to calculate a relative pitch and heading of the aerial vehicle.

9. The vision-based navigation system of claim 4, wherein the onboard processor is configured to identify the perching point as a point approximately halfway between the coordinates identified for said two reflectors.

10. The vision-based navigation system of claim 4, wherein the aerial vehicle further comprises an arresting device to capture the arresting cable at the landing site.

11. The vision-based navigation system of claim 10, wherein the arresting device comprises one or more conductive contacts facilitate charging of the aerial vehicle via the arresting cable.

12. An aerial vehicle for autonomous landing, the aerial vehicle comprising:

a fuselage;

a camera;

an illuminator situated on the aerial vehicle to illuminate two reflectors situated at a landing site; and an onboard processor to identify a perching point at the landing site, wherein the onboard processor identifies the perching point by (i) generating a plurality of coordinates representing features of the landing site using an image thresholding technique, (ii) identifying among said plurality of coordinates a coordinate associated with each of said two reflectors, and (iii) navigate the aerial vehicle toward the identified coordinates associated with each of said two infrared reflectors to enable the aerial vehicle to land at the perching point autonomously.

13. The aerial vehicle of claim 12, wherein the onboard processor is configured to identify said coordinate for each of said two reflectors using a Kalman filter.

14. The aerial vehicle of claim 12, wherein the onboard processor is configured to eliminate one or more coordinates as outlier coordinates using linear correlation.

15. The aerial vehicle of claim 12, wherein the illuminator is an infrared illuminator and the two reflectors are infrared reflectors situated on an arresting cable at the landing site.

16. The aerial vehicle of claim 12, wherein the onboard processor is configured to identify the perching point as a point approximately halfway between the coordinates identified for said two reflectors.

17. The aerial vehicle of claim 15, wherein the onboard processor is configured to calculate a relative bank angle and distance in relation to the arresting cable and to calculate a relative pitch and heading of the aerial vehicle.

18. The aerial vehicle of claim 12, wherein the aerial vehicle further comprises an arresting device to capture an arresting cable at the landing site.

19. The aerial vehicle of claim 18, wherein the arresting device comprises one or more conductive contacts facilitate charging of the aerial vehicle via the arresting cable.

20. The aerial vehicle of claim 19, wherein the aerial vehicle charges an onboard battery using power received from the arresting cable via the arresting device.

* * * * *